United States Patent
Stebbins et al.

(10) Patent No.: US 11,188,853 B2
(45) Date of Patent: Nov. 30, 2021

(54) SYSTEMS AND METHODS FOR ARTIFICIAL INTELLIGENCE (AI) DAMAGE TRIAGE AND DYNAMIC RESOURCE ALLOCATION, ROUTING, AND SCHEDULING

(71) Applicant: The Travelers Indemnity Company, Hartford, CT (US)

(72) Inventors: Tyler D. Stebbins, Tolland, CT (US); Nicolas S. Ares, Newington, CT (US); Layne J. Fabian, East Hartford, CT (US); Stephen P. Readout, Enfield, CT (US); Roger J. Ares, Enfield, CT (US); Easton Lawson, Jr., Vernon, CT (US); Adam D. Sobek, Litchfield, CT (US)

(73) Assignee: The Travelers Indemnity Company, Hartford, CT (US)

( * ) Notice: Subject to any disclaimer, the term of this patent is extended or adjusted under 35 U.S.C. 154(b) by 37 days.

(21) Appl. No.: 16/588,367

(22) Filed: Sep. 30, 2019

(65) Prior Publication Data
US 2021/0097454 A1    Apr. 1, 2021

(51) Int. Cl.
| | | |
|---|---|---|
| *G06Q 10/00* | (2012.01) | |
| *G06Q 10/04* | (2012.01) | |
| *G06N 5/04* | (2006.01) | |
| *G06Q 30/02* | (2012.01) | |
| *G06T 7/70* | (2017.01) | |
| *G06Q 10/06* | (2012.01) | |

(52) U.S. Cl.
CPC ............. *G06Q 10/047* (2013.01); *G06N 5/04* (2013.01); *G06Q 10/06398* (2013.01); *G06Q 10/063112* (2013.01); *G06Q 30/0283* (2013.01); *G06T 7/70* (2017.01); *G06T 2207/10032* (2013.01); *G06T 2207/30184* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 829,804 | A | 8/1906 | Rogers |
| 4,766,539 | A | 8/1988 | Fox |
| 5,111,391 | A | 5/1992 | Fields et al. |
| 5,796,932 | A | 8/1998 | Fox |
| 5,978,769 | A | 11/1999 | Brown et al. |
| 6,049,773 | A | 4/2000 | McCormack |

(Continued)

FOREIGN PATENT DOCUMENTS

| | | |
|---|---|---|
| WO | WO2011050248 | 4/2011 |
| WO | WO2011126448 | 10/2011 |

OTHER PUBLICATIONS

Mohammad Reza Jabbarpour, Houman Zarrabi, Rashid Hafeez Khokhar, Shahaboddin Shamshirband, Kim-Kwang Raymond Choo (Applications of computational intelligence in vehicle traffic congestion problem: a survey, SoftComput (2018) 22:2299-2320) (Year: 2018).*

(Continued)

*Primary Examiner* — Hafiz A Kassim
(74) *Attorney, Agent, or Firm* — RowanTree Law Group, PLLC; Carson C. K. Fincham

(57) ABSTRACT

Systems, apparatus, interfaces, methods, and articles of manufacture that provide for AI damage triage and/or AI resource allocation, routing, and/or scheduling.

19 Claims, 10 Drawing Sheets

(56) References Cited

U.S. PATENT DOCUMENTS

| | | | |
|---|---|---|---|
| 6,105,000 A | 8/2000 | Hickman | |
| 6,301,563 B1 | 10/2001 | Brown | |
| 6,587,831 B1 | 7/2003 | O'Brien | |
| 6,963,853 B1 | 11/2005 | Smith | |
| 7,031,927 B1 | 4/2006 | Beck | |
| 7,080,018 B1 | 7/2006 | Fox | |
| 7,143,051 B1 | 11/2006 | Hanby et al. | |
| 7,162,444 B1 | 1/2007 | Machado, Jr. | |
| 7,184,983 B2 | 2/2007 | Corby | |
| 7,383,125 B2 | 6/2008 | De Silva et al. | |
| 7,395,219 B2 | 7/2008 | Strech | |
| 7,478,051 B2 | 1/2009 | Nourbakhsh et al. | |
| 7,584,133 B2 | 9/2009 | Horowitz | |
| 7,584,134 B2 | 9/2009 | Horowitz | |
| 7,627,491 B2 | 12/2009 | Feyen et al. | |
| 7,668,651 B2 | 2/2010 | Searight et al. | |
| 7,693,766 B2 | 4/2010 | Horowitz | |
| 7,752,106 B1 | 7/2010 | Corby | |
| 7,769,608 B1 | 8/2010 | Woll et al. | |
| 7,769,609 B1 | 8/2010 | Woll | |
| 7,783,542 B2 | 8/2010 | Horowitz | |
| 7,783,543 B2 | 8/2010 | Horowitz | |
| 7,783,544 B2 | 8/2010 | Horowitz | |
| 7,949,548 B2 | 5/2011 | Mathai et al. | |
| 7,953,548 B2 | 5/2011 | Vengroff et al. | |
| 7,966,203 B1 | 6/2011 | Pietrzak | |
| 8,046,245 B1 | 10/2011 | Woll et al. | |
| 8,046,281 B1 | 10/2011 | Urrutia | |
| 8,229,768 B1 | 7/2012 | Hopkins, III | |
| 8,229,769 B1 | 7/2012 | Hopkins, III | |
| 8,239,249 B1 | 8/2012 | Belko et al. | |
| 8,266,042 B2 | 9/2012 | Horowitz | |
| 8,280,633 B1 | 10/2012 | Eldering | |
| 8,346,578 B1* | 1/2013 | Hopkins, III | G06Q 50/16 705/4 |
| 8,386,280 B2 | 2/2013 | Mathai et al. | |
| 8,504,393 B2 | 8/2013 | Stewart et al. | |
| 9,495,667 B1* | 11/2016 | Leise | G05B 23/0275 |
| 9,805,261 B1* | 10/2017 | Loveland | B64F 5/60 |
| 10,102,590 B1* | 10/2018 | Farnsworth | G06Q 40/08 |
| 10,134,092 B1* | 11/2018 | Harvey | G06K 9/6201 |
| 10,354,386 B1* | 7/2019 | Farnsworth | G06T 7/0085 |
| 10,360,601 B1* | 7/2019 | Adegan | G06Q 30/0611 |
| 10,373,256 B1* | 8/2019 | Allen | G06Q 10/10 |
| 10,387,961 B1* | 8/2019 | Burgess | G06Q 40/08 |
| 10,593,109 B1* | 3/2020 | Floyd | G05D 1/0094 |
| 10,635,903 B1* | 4/2020 | Harvey | G06T 7/0002 |
| 10,635,904 B1* | 4/2020 | Adler | G06F 16/29 |
| 10,896,468 B1* | 1/2021 | Hopkins, III | G06Q 40/00 |
| 10,949,814 B1* | 3/2021 | Nelson | G06Q 30/0283 |
| 10,949,930 B1* | 3/2021 | Tofte | G06K 9/00718 |
| 2002/0007289 A1* | 1/2002 | Malin | G06Q 40/08 705/4 |
| 2002/0133289 A1 | 9/2002 | Miyaki | |
| 2003/0014286 A1* | 1/2003 | Cappellini | G06Q 10/025 705/5 |
| 2003/0033184 A1 | 2/2003 | Benbassat et al. | |
| 2004/0148204 A1 | 7/2004 | Menendez | |
| 2004/0186753 A1 | 9/2004 | Kim et al. | |
| 2004/0225535 A1 | 11/2004 | Bond, Jr. | |
| 2005/0234758 A1* | 10/2005 | Nishi | G06Q 50/188 705/80 |
| 2006/0100912 A1* | 5/2006 | Kumar | G06F 16/951 705/4 |
| 2006/0235739 A1* | 10/2006 | Levis | G06Q 10/08 705/1.1 |
| 2006/0242154 A1* | 10/2006 | Rawat | G06F 16/168 |
| 2007/0118291 A1 | 5/2007 | Carttar | |
| 2008/0097811 A1* | 4/2008 | Kramer | G06Q 10/06 705/7.12 |
| 2008/0114608 A1* | 5/2008 | Bastien | G06Q 10/06398 705/7.42 |
| 2009/0092232 A1 | 4/2009 | Geldenbott et al. | |
| 2009/0265193 A1* | 10/2009 | Collins | G06Q 30/0185 705/4 |
| 2009/0279734 A1 | 11/2009 | Brown | |
| 2010/0063851 A1 | 3/2010 | Andrist | |
| 2010/0121886 A1 | 5/2010 | Koshiba et al. | |
| 2010/0153140 A1 | 6/2010 | Helitzer et al. | |
| 2011/0161119 A1* | 6/2011 | Collins | G06Q 40/08 705/4 |
| 2012/0066005 A1 | 3/2012 | Stewart et al. | |
| 2013/0132127 A1 | 5/2013 | Mathai | |
| 2013/0197807 A1 | 8/2013 | Du et al. | |
| 2013/0226624 A1 | 8/2013 | Blessman | |
| 2013/0262152 A1 | 10/2013 | Collins et al. | |
| 2013/0262153 A1 | 10/2013 | Collins et al. | |
| 2013/0262530 A1* | 10/2013 | Collins | G06F 16/29 707/812 |
| 2013/0278442 A1* | 10/2013 | Rubin | G01C 21/3822 340/905 |
| 2013/0282267 A1* | 10/2013 | Rubin | G08G 1/167 701/301 |
| 2014/0040282 A1* | 2/2014 | Mann | B64G 1/1021 707/748 |
| 2014/0304007 A1 | 10/2014 | Kimball et al. | |
| 2014/0310162 A1 | 10/2014 | Collins et al. | |
| 2015/0012169 A1* | 1/2015 | Coard | G06Q 20/202 701/29.1 |
| 2015/0046194 A1 | 2/2015 | Waddell | |
| 2015/0170288 A1* | 6/2015 | Harton | G06Q 40/08 705/4 |
| 2015/0178850 A1* | 6/2015 | Machnicki | G06Q 40/08 705/4 |
| 2015/0194059 A1* | 7/2015 | Starr | G08G 5/0017 701/3 |
| 2015/0370251 A1* | 12/2015 | Siegel | G05D 1/00 701/2 |
| 2015/0371543 A1* | 12/2015 | Amodio Leon | G08G 5/0034 701/528 |
| 2016/0093212 A1* | 3/2016 | Barfield, Jr. | G08G 1/0133 348/144 |
| 2016/0180265 A1* | 6/2016 | Yanicke | G06Q 10/0635 705/7.28 |
| 2016/0343003 A1* | 11/2016 | Howe | G06Q 30/0201 |
| 2017/0148101 A1* | 5/2017 | Franke | G06K 9/6202 |
| 2017/0148102 A1* | 5/2017 | Franke | G06Q 30/0278 |
| 2017/0293894 A1* | 10/2017 | Taliwal | G06K 9/00671 |
| 2017/0323274 A1* | 11/2017 | Johnson | G05B 23/0251 |
| 2018/0025458 A1* | 1/2018 | Swamy | H04L 51/20 705/7.26 |
| 2018/0252829 A1* | 9/2018 | Koppang | G06K 9/00637 |
| 2018/0260793 A1* | 9/2018 | Li | G06T 7/001 |
| 2018/0293664 A1* | 10/2018 | Zhang | G06K 9/4628 |
| 2018/0341274 A1* | 11/2018 | Donnelly | H04W 4/46 |
| 2018/0350163 A1* | 12/2018 | Pofale | G06Q 30/0283 |
| 2019/0101401 A1* | 4/2019 | Balva | G06Q 10/047 |
| 2019/0102874 A1* | 4/2019 | Goja | G06N 20/00 |
| 2019/0114717 A1* | 4/2019 | Labrie | G06K 9/6212 |
| 2019/0176862 A1* | 6/2019 | Kumar | G06K 9/00651 |
| 2019/0303982 A1* | 10/2019 | Michel | G06K 9/00637 |
| 2019/0325763 A1* | 10/2019 | Hux | A63F 13/5255 |
| 2020/0090321 A1* | 3/2020 | Xu | G06Q 30/0283 |

OTHER PUBLICATIONS

E. Angelelli, I. Arsik, V. Morandi, M. Savelsbergh, and M.G. Speranza (Proactive route guidance to avoid congestion, Transportation Research Part B 94 (2016) 1-21). (Year: 2016).*

Rakesh Kumar Phanden, Ajai Jain, and Rajiv Verma et al. (Integration of process planning and scheduling: a state-of-the-art review, International Journal of Computer Integrated Manufacturing, vol. 24, No. 6, Jun. 2011, 517-534). (Year: 2011).*

Amy Mainville Cohn (Improving Crew Scheduling by Incorporating Key Maintenance Routing Decisions, Operations Research, 2003 INFORMS). (Year: 2003).*

"Big Data Analytics: Location Intelligence Conference", Claraview, Washington, D.C., 7 pp.

(56) References Cited

OTHER PUBLICATIONS

"Amica Insurance Selects Weather Fusion's HailScope to Power Custom Mapping Applications for Claims Handling", PRWeb, downloaded from http://www.prweb.eom/releases/2013/8/prweb11075752.htm, 2 pp.
Office Action for U.S. Appl. No. 13/836,707 dated Dec. 5, 2013, 22 pp.
"Assessing and Managing Flood Risk in the 21st Century", White Paper, CoreLogic, Inc., 7 pp.
International Search Report for PCT/US2013/034189 dated Jul. 9, 2013, 5 pp.
Written Opinion for PCT/US2013/034189 dated Jul. 9, 2013, 5 pp.
Office Action for U.S. Appl. No. 13/857,981 dated Sep. 22, 2014, 24 pp.
International Search Report for PCT/US2014/069664 dated Apr. 8, 2015, 4 pp.
International Written Opinion for PCT/US2014/069664 dated Apr. 8, 2015, 11 pp.
International Preliminary Report on Patentability for PCT/US2013/034189 dated Oct. 1, 2014, 6 pp.
Office Action for U.S. Appl. No. 14/280,892 dated Oct. 9, 2015; 15 pps.
Final Office Action for U.S. Appl. No. 14/280,892 dated Jul. 1, 2016; 25 pps.
Apte, Uday et al. Chapter 10 Improving Claims Operations: A Model-Based Approach; pp. 1-20.
Apte, Uday et al. "A Capacity Planning Model for the Claims Handling Process" pp. 67-82.
Bhambi, Amit, "Improving Insurance Claim Throughput and Quality with Lean Process Improvement" Mar. 23, 2009, http://www.processexcellenccenetwork.com/business-process-manangement-bpm/articles/improving-insurance-claim-throughput-and-quality-w); 4 pps.
Office Action for U.S. Appl. No. 13/544,408 dated Aug. 27, 2013; 18 pps.
Notice of Allowance for U.S. Appl. No. 3/544,408 dated Jul. 3, 2014; 10 pps.
Office Action for U.S. Appl. No. 13/544,408 dated Aug. 21, 2014; 7 pps.
Final Office Action for U.S. Appl. No. 13/544,408 dated Mar. 10, 2015; 10 pps.

\* cited by examiner

540 ↘

544a

| RESOURCE ID 544a-1 | LEVEL 544a-2 | RATING 544a-3 | LOCATION 544a-4 | ROUTE ID 544a-5 | SCHEDULE ID 544a-6 |
|---|---|---|---|---|---|
| MD-2836 | B | NEW | ROWE BLVD. | 19-8746 | AUG01-H7G5 |
| MD-8437 | 23 | PREMIER | SHAW ST. | 19-8355 | AUG01-00276 |
| VA-9022 | GOLD | HEAVY | LEJEUNE | 19-0026 | AUG02-J5DA |

544b

| SCHEDULE ID 544b-1 | TIME 544b-2 | CLAIM ID 544b-3 | ROUTE ID 544b-4 |
|---|---|---|---|
| AUG01-H7G5 | 0800 | 19080002 | 19-8746 |
| AUG01-H7G5 | 0900 | 19080003 | 19-8746 |
| AUG01-H7G5 | 1130 | 19080004 | 19-8746 |
| AUG01-H7G5 | 1510 | 19080023 | A-527-D |

544c

| CLAIM ID 544c-1 | ACCOUNT ID 544c-2 | REPORTED 544c-3 | STATUS 544c-4 | SEVERITY 544c-5 | LOCATION 544c-6 | TYPE 544c-7 |
|---|---|---|---|---|---|---|
| 19080001 | MD038A689 | 08/01/19 | OPEN | HIGH | CALVERT ST. | CAT 5 |
| 19080002 | MD037A875 | 08/01/19 | WAIT >5 | $4,500 | EAST ST. | WIND |
| 19080003 | MD048B112 | 08/01/19 | WAIT >5 | $6,250 | EAST ST. | WIND |
| 19080004 | MD039C456 | 08/07/19 | NEW | C | NEWMAN ST. | WATER |
| 19080005 | MD058F135 | 08/02/19 | CLOSED | LOW | OGLE HALL | STRUC |

*FIG. 5*

SYSTEMS AND METHODS FOR ARTIFICIAL INTELLIGENCE (AI) DAMAGE TRIAGE AND DYNAMIC RESOURCE ALLOCATION, ROUTING, AND SCHEDULING

BACKGROUND

Responses to catastrophic or wide-area events have often been slow, disjointed, and/or inefficient. The most common method of addressing large-scale responses, for example, is to divide the total number of necessary response/site visits among a pool of available resources. Even in a hypothetical ideal case where each resource is equally effectual and each necessary response location requires an identical type and/or magnitude of response, however, the routing and/or scheduling of such resource visits can often be highly inefficient. While human dispatchers, route planning software, and location tracking abilities may each be utilized to increase the effectiveness of a response, each tool fails to solve deficiencies in the overall process. Knowing where resources are located (location tracking) and plotting routes between known locations (route/trip planning software) may offer an adequate starting plan, for example, but are not capable of handling discrepancies from ideal/typical transportation conditions or efficiently incorporating changes to individual resource schedules. Similarly, while human dispatch resources offer the ability to adapt to changing circumstances, they are not capable of incorporating mass changes into large response plans in a timely or uniform fashion.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 5 is a block diagram of an example data storage structure according to some embodiments;

DETAILED DESCRIPTION

I. Introduction

Figure 1:
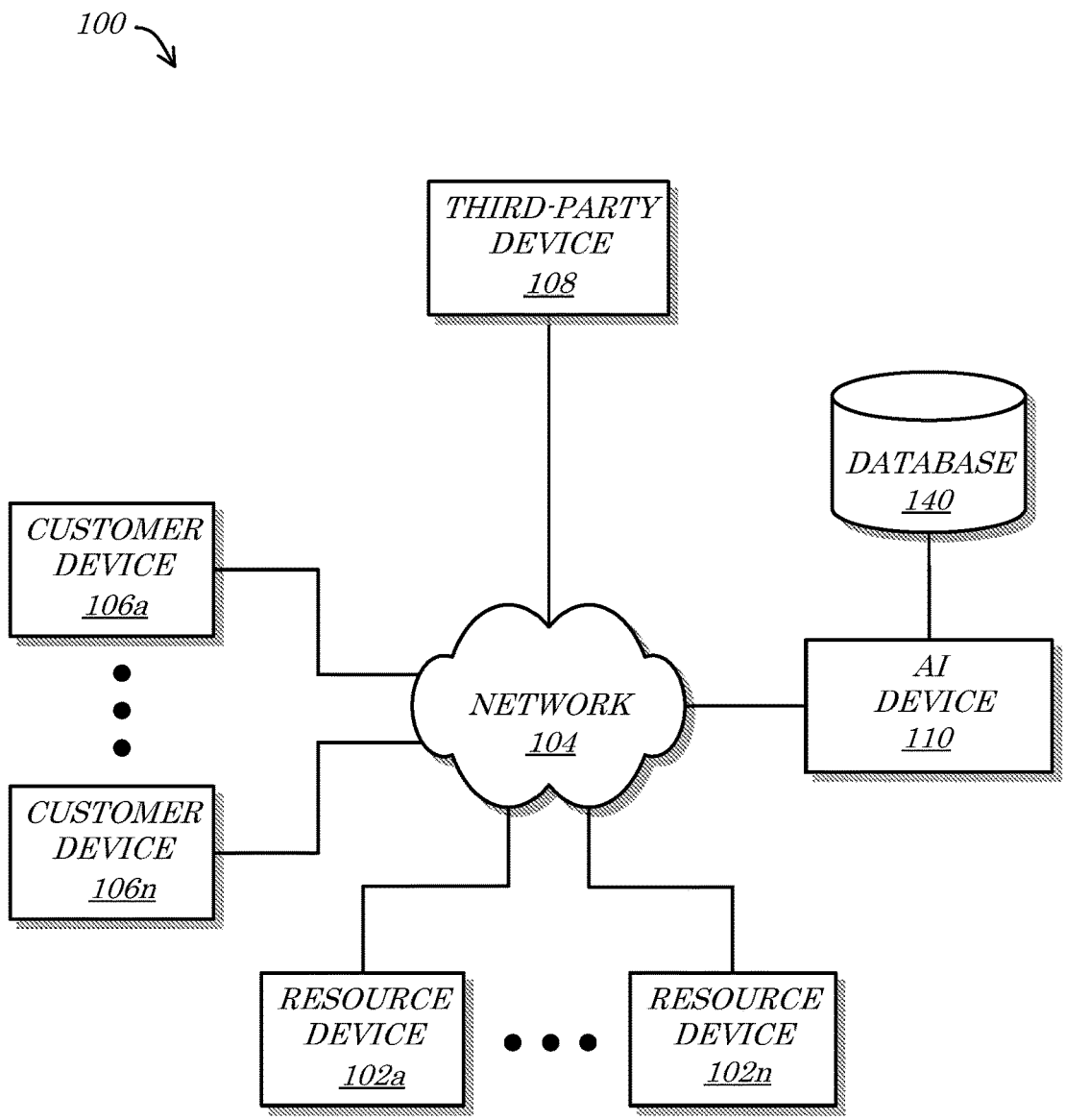
FIG. 1 is a block diagram of a system according to some embodiments.

Embodiments described herein are descriptive of systems, apparatus, methods, interfaces, and articles of manufacture for Artificial Intelligence (AI) damage triage and dynamic resource allocation, routing, and scheduling.

Using conventional electronic processing systems it is now possible to automate tasks that were traditionally accomplished via manual means, such as utilizing notebooks, human operators and dispatchers, and telephone calls. Resource allocation and scheduling traditionally involved management of hard copy schedules in notebooks or day planners, for example, with changes or updates being communicated via pagers or landline telephone calls. Today, such traditional methods have largely been replaced with online task management, electronic trip planning, and electronic scheduling software and systems. While such automation has increased the efficiency of response plans and management of resources, many underlying deficiencies remain.

According to embodiments described herein, these and other deficiencies are remedied by implementation of specifically programmed and interconnected AI logic rules sets and/or modules that greatly enhance the functionality of the electronic processing systems that may be utilized for response planning. As described herein, for example, deeply embedded and complex AI rule sets may be interlaced with event response processing system components to provide AI-based damage triage and dynamic resource allocation, routing, and/or scheduling. In such a manner, even complex event response plans and strategies may be dynamically (e.g., in real-time or near real-time) modified to account for changing circumstances with a speed, uniformity, and efficiency that were not previously possible utilizing typical systems. Increased efficiencies in response plan management may greatly reduce response costs, minimize resource waste, speed individual response times and accordingly increase response satisfaction levels. Greater response efficiencies may also reduce follow-on losses by enabling speedier damage repairs and/or loss mitigation.

According to some embodiments, the embedded AI rules sets may be interlaced to provide for a multi-layer AI processing fabric that provides technical advances over previous systems. Each separate AI rule set may be specifically interfaced, for example, to pass not only processing results (such as triage analysis, resource allocation, dynamic object-based routing, and/or AI-based scheduling) to an interconnected AI module, but to provide additional AI-learning inputs. AI learning data for a first AI module (such as a dynamic routing module) may be provided from a second AI module (such as an object-based damage triage module) such that each of the functionally distinct modules may effectively learn from each other. Such interlacing may require fewer processing and/or data storage resources and may also or alternatively reduce required processing bandwidth constraints.

II. AI Damage Triage and Resource Allocation, Routing, and Scheduling Systems Referring first to FIG. 1, a block diagram of a system 100 according to some embodiments is shown. In some embodiments, the system 100 may comprise a plurality of resource devices 102a-n in communication via or with a network 104. According to some embodiments, system 100 may comprise a plurality of customer devices 106a-n, a third-party device 108, and/or an AI device 110, e.g., any or all of which may be in communication with or via the network 104. In some embodiments, any or all of the devices 102a-n, 106a-n, 108, 110 may comprise and/or be in communication with a data storage, database, and/or memory device 140. According to some embodiments, communications between and/or within the devices 102a-n, 106a-n, 108, 110, 140 of the system 100 may be utilized to (i) capture and analyze images to perform automatic triage of damaged locations and/or objects, (ii) allocate resources to triaged locations, (iii) route and/or re-route allocated resources (e.g., based on AI analysis of transportation image data), and/or (iv) dynamically schedule and/or re-schedule allocated resources (e.g., based on dynamic AI-based routing/re-routing).

Fewer or more components 102a-n, 104, 106a-n, 108, 110, 140 and/or various configurations of the depicted components 102a-n, 104, 106a-n, 108, 110, 140 may be included in the system 100 without deviating from the scope of embodiments described herein. In some embodiments, the components 102a-n, 104, 106a-n, 108, 110, 140 may be similar in configuration and/or functionality to similarly named and/or numbered components as described herein. In some embodiments, the system 100 (and/or portion thereof) may comprise an AI-based damage analysis/triage and/or resource allocation, routing, and/or scheduling system, and/or platform programmed and/or otherwise configured to execute, conduct, and/or facilitate the method 600 of FIG. 6 herein, and/or portions thereof.

According to some embodiments, the resource devices 102a-n and/or the customer devices 106a-n may comprise any type or configuration of computing, mobile electronic, network, user, and/or communication devices that are or become known or practicable. The resource devices 102a-n and/or the customer devices 106a-n may, for example, comprise one or more Personal Computer (PC) devices, computer workstations, tablet computers, such as an iPad® manufactured by Apple®, Inc. of Cupertino, Calif., and/or cellular and/or wireless telephones, such as an iPhone® (also manufactured by Apple®, Inc.) or an LG V50 THINQ™ 5G smart phone manufactured by LG® Electronics, Inc. of San Diego, Calif., and running the Android® operating system from Google®, Inc. of Mountain View, Calif. In some embodiments, the resource devices 102a-n and/or the customer devices 106a-n may comprise one or more devices owned and/or operated by one or more users (not shown), such as catastrophic event response personnel (e.g., emergency response staff, claims handlers, appraisers, repair personnel) and/or electronic product (e.g., underwriting product) customers/account holders (or potential customers/account holders). According to some embodiments, the resource devices 102a-n and/or the customer devices 106a-n may communicate with the AI device 110 either directly or via the network 104 to provide damage/loss imagery, provide location information, obtain allocation and/or scheduling lists, obtain routing information, and/or obtain and/or generate an event response interface, in accordance with AI-based damage analysis/triage and/or resource allocation, routing, and/or scheduling as described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the AI device 110, the resource devices 102a-n, the customer devices 106a-n, the third-party device 108, and/or the memory device 140. In some embodiments, the network 104 may comprise direct communication links between any or all of the components 102a-n, 106a-n, 108, 110, 140 of the system 100. The resource devices 102a-n may, for example, be directly interfaced or connected to one or more of the AI device 110, the customer devices 106a-n, and/or the third-party device 108 via one or more wires, cables, wireless links, and/or other network components, such network components (e.g., communication links) comprising portions of the network 104. In some embodiments, the network 104 may comprise one or many other links or network components other than those depicted in FIG. 1. The AI device 110 may, for example, be connected to the resource devices 102a-n via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106a-n, 108, 110, 140 of the system 100. The network 104 may comprise one or more cellular telephone networks with communication links between the customer devices 106a-n and the AI device 110, for example, and/or may comprise an NFC or other short-range wireless communication path, with communication links between the resource devices 102a-n and the customer devices 106a-n, for example.

According to some embodiments, the third-party device 108 may comprise any type or configuration of a computerized processing device, such as a PC, laptop computer, computer server, database system, and/or other electronic device, devices, or any combination thereof. In some embodiments, the third-party device 108 may be owned and/or operated by a third-party (i.e., an entity different than any entity owning and/or operating either the resource devices 102a-n, the customer devices 106a-n, or the AI device 110; such as a certificate, authentication, and/or cryptographic service provider, and/or a satellite and/or other imagery provider). The third-party device 108 may, for example, comprise an imagery service and/or database repository that provides imagery and/or map data for processing by the AI device 110. In some embodiments, the third-party device 108 may provide and/or transmit transportation alerts and/or imagery (e.g., traffic camera footage) to the AI device 110 and/or the resource devices 102a-n. According to some embodiments, the third-party device 108 may comprise a plurality of devices and/or may be associated with a plurality of third-party entities. In some embodiments, the third-party device 108 may comprise the memory device 140 (or a portion thereof), such as in the case the third-party device 108 comprises a third-party data storage service, device, and/or system, such as the Amazon® Simple Storage Service (Amazon® S3™) available from Amazon.com, Inc. of Seattle, Wash. or an open-source third-party database service, such as MongoDB™ available from MongoDB, Inc. of New York, N.Y.

In some embodiments, the AI device 110 may comprise an electronic and/or computerized controller device, such as a computer server and/or server cluster communicatively coupled to interface with the resource devices 102a-n and/or the customer devices 106a-n (directly and/or indirectly). The AI device 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the AI device 110 may be located remotely from one or more of the resource devices 102a-n and/or the customer devices 106a-n. The AI device 110 may also or alternatively comprise a plurality of electronic processing devices located at one or more various sites and/or locations (e.g., a distributed computing and/or processing network).

According to some embodiments, the AI device 110 may store and/or execute specially programmed instructions (not separately shown in FIG. 1) to operate in accordance with embodiments described herein. The AI device 110 may, for example, execute one or more programs, modules, and/or routines (e.g., AI code and/or logic) that facilitate the analysis of damage and/or transportation imagery to triage catastrophic event losses at different locations and/or to dynamically route resources to such locations, as described herein. According to some embodiments, the AI device 110 may execute stored instructions, logic, and/or software modules to (i) identify an object (not shown) in an image of a loss location, (ii) compute and/or characterize a loss magnitude and/or type of the loss location, (iii) identify a resource suited to address the loss location, (iv) allocate one or more resources to the loss location, (v) identify an object in an image of a transportation object, (vi) route an allocated resource to the loss location (e.g., taking into account the identified object), (vii) generating a schedule for an allocated resource to visit/address a plurality of loss locations, and/or (xi) provide an interface via which a resource and/or a customer (or other user) may view and/or manage loss location allocations, routes, and/or schedules, as described herein.

In some embodiments, the resource devices 102*a-n*, the customer devices 106*a-n*, the third-party device 108, and/or the AI device 110 may be in communication with and/or comprise the memory device 140. The memory device 140 may comprise, for example, various databases and/or data storage mediums that may store, for example, image data, object identification rules, object data, resource allocation data, resource allocation rules, map and/or transportation object data, routing rules, scheduling data, scheduling rules, cryptographic keys and/or data, login and/or identity credentials, and/or instructions (e.g., AI-based damage triage and resource allocation, routing, and/or scheduling instructions) that cause various devices (e.g., the AI device 110, the third-party device 108, resource devices 102*a-n*, the customer devices 106*a-n*) to operate in accordance with embodiments described herein.

The memory device 140 may store, for example, various AI code and/or mobile device applications and/or interface generation instructions, each of which may, when executed, participate in and/or cause AI-based damage triage and resource allocation, routing, and/or scheduling, as described herein). In some embodiments, the memory device 140 may comprise any type, configuration, and/or quantity of data storage devices that are or become known or practicable. The memory device 140 may, for example, comprise an array of optical and/or solid-state hard drives configured to store digital image and/or video data, image and/or object analysis data and/or resource allocation, routing, and/or scheduling data (e.g., analysis formulas and/or mathematical models), credentialing instructions and/or keys, and/or various operating instructions, drivers, etc. In some embodiments, the memory device 140 may comprise a solid-state and/or non-volatile memory card (e.g., a Secure Digital (SD) card such as an SD Standard-Capacity (SDSC), an SD High-Capacity (SDHC), and/or an SD eXtended-Capacity (SDXC) and any various practicable form-factors, such as original, mini, and micro sizes, such as are available from Western Digital Corporation of San Jose, Calif. While the memory device 140 is depicted as a stand-alone component of the AI device 110, the memory device 140 may comprise multiple components. In some embodiments, a multi-component memory device 140 may be distributed across various devices and/or may comprise remotely dispersed components. Any or all of the resource devices 102*a-n*, the customer devices 106*a-n*, the third-party device 108, and/or the AI device 110 may comprise the memory device 140 or a portion thereof, for example.

Figure 2:
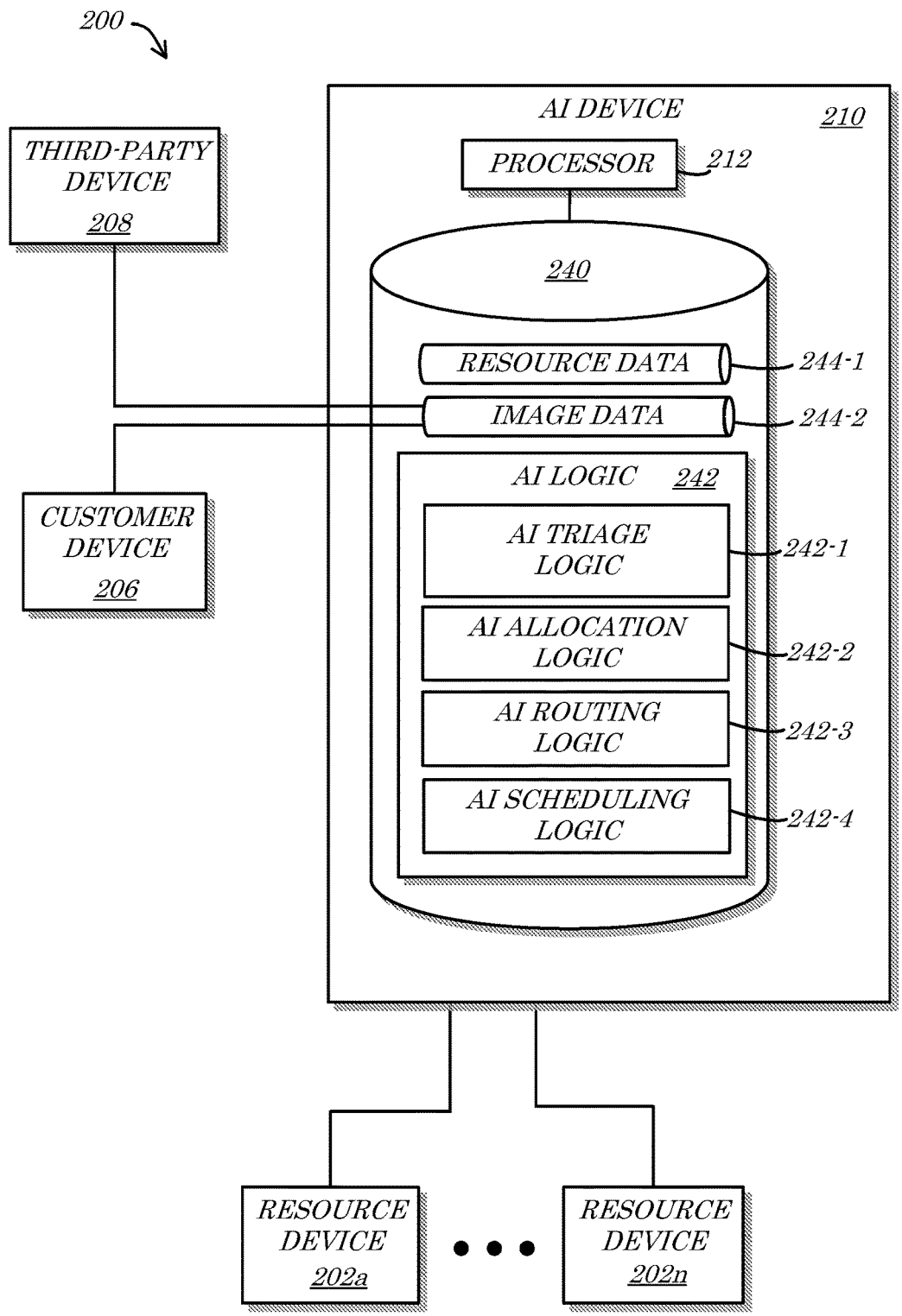
FIG. 2 is a block diagram of a system according to some embodiments.

Turning now to FIG. 2, a block diagram of a system 200 according to some embodiments is shown. In some embodiments, the system 200 may comprise one or more resource devices 202*a-n*, a customer device 206, and/or a third-party device 208 in communication with an AI device 210. According to some embodiments, the AI device 210 may be remote from any or all of the other components 202*a-n*, 206, 208 and may be communicatively coupled therewith via various networks, wires, and/or transmission devices (not shown in FIG. 2) as are or become known or practicable. In some embodiments, the AI device 210 may comprise a centralized server or other computing device comprising one or more processors 212 and/or may be in communication with a memory device 240. The memory device 240 may, in some embodiments, store various programs, instructions, and/or logic such as AI logic 242, that may be executed by the processor 212 to cause the AI device 210 to operate in accordance with embodiments herein.

According to some embodiments, the AI logic 242 may comprise various rules sets and/or modules such as AI triage logic 242-1, AI allocation logic 242-2, AI routing logic 242-3, and/or AI scheduling logic 242-4. According to some embodiments, the AI triage logic 242-1 may comprise a first set of coded rules operable to (e.g., upon execution by the processor 212) identify objects within images, identify or estimate a magnitude or severity of the damage, classify the damage, and/or assign a weight, score, and/or ranking to the damage (e.g., with respect to other objects and/or locations of damage that have been analyzed/triaged). In some embodiments, the AI allocation logic 242-2 may comprise a second set of coded rules operable to (e.g., upon execution by the processor 212) assign one or more available resources to one or more identified locations and/or objects requiring attention. The AI allocation logic 242-2 may, for example, match types and/or magnitudes of damage or loss with resources (e.g., personnel and/or equipment) that are qualified, adapted, and/or suited for addressing the type and/or magnitude of damage. In some embodiments, the location of the damage may be compared to a location of a resource to select a most proximate resource and/or may be compared to types of locations served by certain resources (e.g., off-road capability) to assign compatible resources to damage locations. According to some embodiments, the AI routing logic 242-3 may comprise a third set of coded rules operable to (e.g., upon execution by the processor 212) identify routes between two or more locations, such as a current location of a resource and a location of damage assigned to the resource. In some embodiments, the AI routing logic 242-3 may comprise logic that identifies transportation anomalies and/or disruptions by conducting object recognition on overhead imagery of a transportation route.

According to some embodiments, the AI scheduling logic 242-4 may comprise a fourth set of coded rules operable to (e.g., upon execution by the processor 212) create, coordinate, and/or dynamically modify schedules for a plurality of allocated resources. Based on output and/or results from the AI routing logic 242-3, for example, the AI scheduling logic 242-4 may assign times and/or orders of site visits to each of a plurality of allocated resources and/or may notify the allocated resources and/or corresponding entities associated with site visit locations of the scheduled visits. In the case that the AI routing logic 242-3 identifies transportation disruptions, e.g., during an active schedule window (e.g., during a given workday or other group of visits or events) for an allocated resource, for example, the AI scheduling logic 242-4 may dynamically recalculate and/or reassign times and/or orders to site visits to account for the changes in the routing. Similarly, in the case that a particular visit/waypoint is satisfied (e.g., out of order, by a different resource, and/or cancelled), the AI scheduling logic 242-4 may update the appropriate schedule(s) to account for the change.

In some embodiments, the memory device 240 may store resource data 244-1 descriptive of a pool of available event response resources such as claim handlers, technicians, and/or other response personnel and/or assets (e.g., equipment, vehicles, supplies, etc.). The resource data 244-1 may comprise, for example, data descriptive of various qualities, characteristics, and/or attributes of any given resource, such as a current location, transportation abilities, skills, ratings, training levels, experience levels, statistical metrics (e.g., previous success rates, speed of resolution, etc.), and/or availability (e.g., schedule data). According to some embodiments, the memory device 240 may store image data 244-2, e.g., received from one or more of the customer device 206 and the third-party device 208. The image data 244-2 may comprise, for example, various aerial, satellite, drone, overhead, perspective, thermal imaging, and/or other imagery data (still images, videos, etc.) descriptive of one or more damaged locations and/or objects, paths, roadways, and/or other transportation objects. In some embodiments, the image data 244-2 may comprise reference data utilized to identify objects within input images/video.

In some embodiments, the AI device 210 may request that either or both of the customer device 206 and the third-party device 208 capture and/or provide images descriptive of a loss location and/or transportation object. According to some embodiments, the images (and/or video or other sensor data) may be processed by the processor 212 by an execution of the AI logic 242 stored in the memory device 240. The AI triage logic 242-1 and/or the AI routing logic 242-3 may, for example, comprise various specially programmed rules and logic, such as an object detection algorithm that is utilized to identify, classify, score, rank, and/or otherwise process instances of damage, loss, and/or compromised transportation resource. The AI device 210 may determine, based on image-based object analysis for example, that a reported loss at a location of the customer device 206 comprises a particular type of loss (e.g., wind damage to a roof of a building), that the damage is expected to cost more than ten thousand dollars ($10,000) to repair, and/or that a primary road for accessing the location is blocked (e.g., by a downed tree and/or flood waters).

According to some embodiments, the analysis of the damage may be utilized, e.g., by the AI allocation logic 242-2 to assign a particular damage analysis resource (e.g., a claim handler) to the location. In some embodiments, the AI routing logic 242-3 may be utilized to generate a driving route from a current location of the allocated resource to the location, e.g., avoiding any compromised transportation resources (e.g., blocked roads). According to some embodiments, the AI scheduling logic 242-4 may be utilized to schedule a plurality of location visits allocated to the particular damage analysis resource, e.g., permitting appropriate travel time between locations and permitting an estimated amount of time to assess and/or manage each location (e.g., based on the severity and/or other ranking or metric descriptive of the damage at each location).

Fewer or more components 202a-n, 206, 208, 210, 212, 240, 242, 242-1, 242-2, 242-3, 242-4, 244-1, 244-2 and/or various configurations of the depicted components 202a-n, 206, 208, 210, 212, 240, 242, 242-1, 242-2, 242-3, 242-4, 244-1, 244-2 may be included in the system 200 without deviating from the scope of embodiments described herein. In some embodiments, the components 202a-n, 206, 208, 210, 212, 240, 242, 242-1, 242-2, 242-3, 242-4, 244-1, 244-2 may be similar in configuration and/or functionality to similarly named and/or numbered components as described herein. In some embodiments, the system 200 (and/or one or more portions thereof) may comprise an AI-based damage analysis/triage and/or resource allocation, routing, and/or scheduling system, and/or platform programmed and/or otherwise configured to execute, conduct, and/or facilitate the method 600 of FIG. 6 herein, and/or portions thereof.

Figure 3:
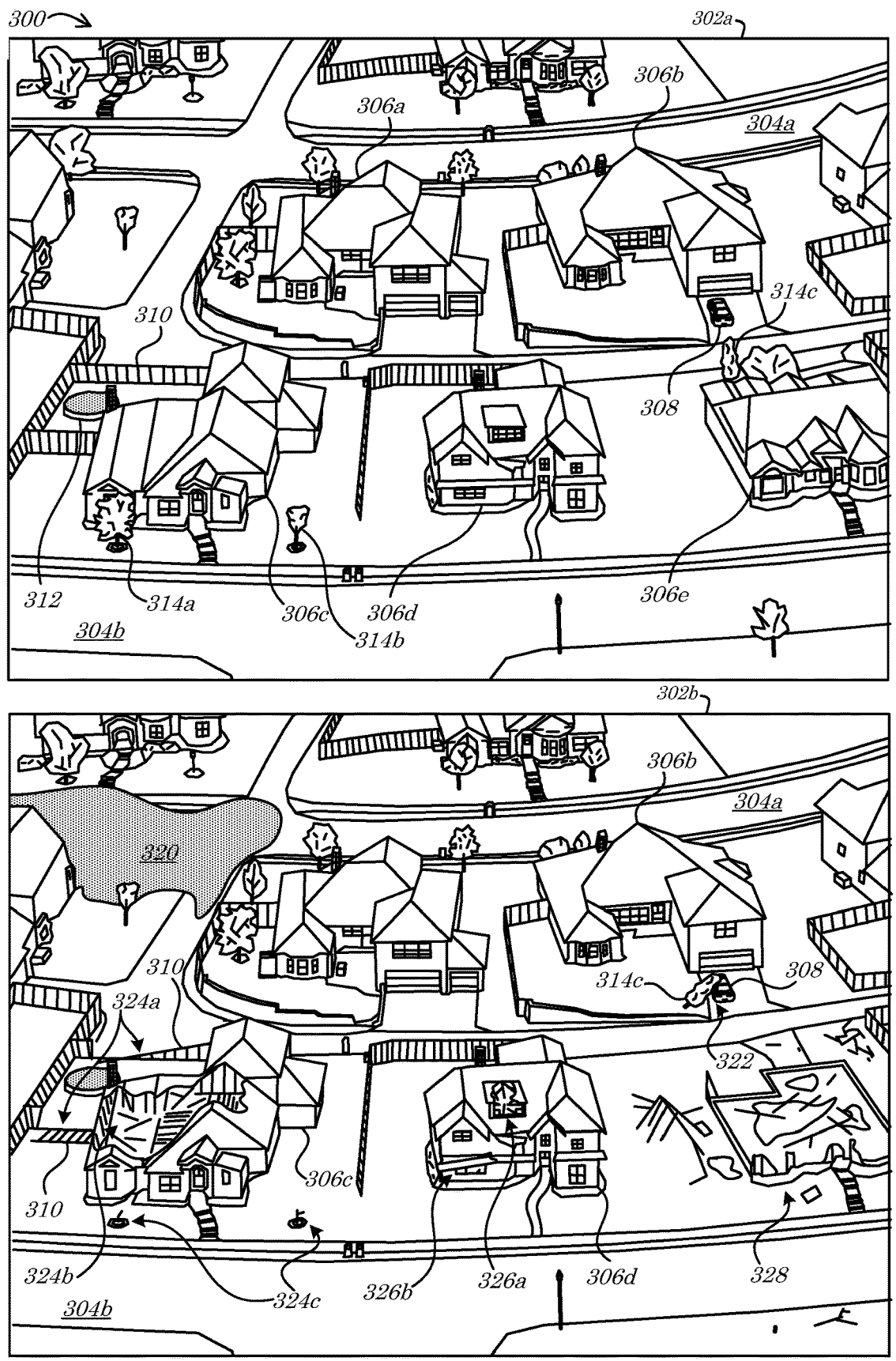
FIG. 3 is a perspective diagram of an example image analysis system according to some embodiments.

Referring now to FIG. 3, a perspective diagram of an example image analysis system 300 according to some embodiments shown. The system 300 may comprise, for example, a first image 302a and a second image 302b of a location (e.g., a residential neighborhood, as shown for purposes of non-limiting example). The first image 302a may be captured at a first time, such as before a catastrophic event, for example, and the second image 302b may be captured at a second time, such as after the catastrophic event. Either or both of the images 302a-b may be acquired by satellites, aircraft, drones, security cameras, and/or customer devices (such as the customer devices 106a-n, 206 of FIG. 1 and/or FIG. 2 herein). In some embodiments, the images 302a-b may show or include various roads 304a-b (i.e., transportation objects), various structures, such as a plurality of homes 306a-e, and/or various other objects, such as a car 308, fencing 310, a pool 312, and/or trees 314a-c. According to some embodiments, AI logic may be executed utilizing the images 302a-b as input to identify one or more of these objects 304a-b, 306a-e, 308, 310, 312, 314a-c in one or more of the images 302a-b.

In some embodiments, an object detection and/or identification algorithm may be utilized to identify a first road 304a on which are located a first home 306a and a second home 306b. According to some embodiments, the object detection and/or identification algorithm may be utilized to identify a second road 304b on which are located a third home 306c, a fourth home 306d, and/or a fifth home 306e, e.g., all in the first image 302a. In some embodiments, the car 308 may be identified and a location of the car 308 may be determined to be at the second home 306b (and/or parked in a driveway thereof). According to some embodiments, the fence 310 may be identified around the pool 312 and, together with a first tree 314a and a second tree 314b, may be determined to be located at the third home 306c. In some embodiments, a third tree 314c may be identified and determined to be located at the fifth home 306e. In some embodiments, any or all of the objects 304a-b, 306a-e, 308, 310, 312, 314a-c may be identified in the first image 302a (e.g., pre-storm) and/or the second image 302b (e.g., post-storm).

According to some embodiments, the identified objects 304a-b, 306a-e, 308, 310, 312, 314a-c may be compared between the images 302a-b to identify differences in the objects 304a-b, 306a-e, 308, 310, 312, 314a-c (and/or their respective locations within the images 302a-b). In some embodiments, the comparison may identify new objects or features in the second image 302b, such as a transportation object obstruction 320 (e.g., a flooding of the first road 304a). According to some embodiments, the comparison may identify and/or locate an object collision 322, such as the third tree 314c having been blown into the car 308 in the driveway of the second home 306b. In some embodiments, the comparison may identify and/or locate first damage 324a-c at the third home 306c and/or second damage 326a-b at the fourth home 306d. Object comparison models may be utilized, for example, to identify a first instance of the first damage 324a comprising movement of the fencing 310 (e.g., the fencing 310 around the pool 312 at the third home 306c has been knocked down), a second instance of the first damage 324b, comprising a difference in the appearance of the roof of the third house 306c (e.g., a large section has been destroyed, as shown), and/or a third instance of the first damage 324c comprising a failure to identify the first and second trees 314a-b in the second image 302b (e.g., the first and second trees 314a-b have been blown away by the storm).

In some embodiments, object comparison models may be utilized to identify a first instance of the second damage 326a, comprising a damaged dormer of the fourth home 306d and/or a second instance of the second damage 326b, comprising a damaged eave and/or window of the fourth home 306d. According to some embodiments, object comparison models may be utilized to identify a complete or catastrophic loss 328, such as the destruction of the fifth home 306e down to the foundation. In some embodiments, the identified losses (e.g., the collision 322, first damage 324a-c, second damage 326a-b, and/or catastrophic loss 328) may be categorized and/or valued. Object analysis algorithms and/or rules may, for example, compare the total roof area of the fourth home 306d to the identified second damage 326a-b to compute a percentage of damaged roof area (e.g., approximately fifteen percent (15%) as shown) and/or may measure the length of damaged fencing 310 comprising the first instance of the first damage 324a to determine an amount of replacement fencing that will be required. In some embodiments, the type of fencing 310 may be determined (e.g., the fencing 310 should be pool fencing since it surrounds the pool 312) and/or the type of roofing material (e.g., architectural shingles, tile, slate) may be determined based on object analysis conducted on the images 302a-b. In some embodiments, stored data, such as a market value of the fifth home 306e, may be utilized to estimate the cost of a total rebuild (from the foundation up) of the fifth home 306e due to the identified catastrophic loss 328.

According to some embodiments, the object analysis and/or data from the images 302a-b may be utilized to value, rank, score, and/or triage the losses 322, 324a-c, 326a-b, 328. Such triage may then be utilized, for example, to allocate and/or schedule damage analysis (and/or other response) resources to visit the location(s) in the images 302a-b. In some embodiments, the object analysis may be utilized to inform a routing process for the allocated resources. The transportation object obstruction 320 blocking the first road 304a may be identified and utilized to route allocated resources along the second road 304b instead, for example, providing real-time navigational routing directed to minimizing travel delays and thereby optimizing the schedules of the allocated resources. The less time spent on the roads 304a-b, for example, the more time is available for resources to dedicate to assessing and/or addressing needs of customers and/or other users, e.g., that live in the homes 306a-e depicted in the images 302a-b.

Figure 4:
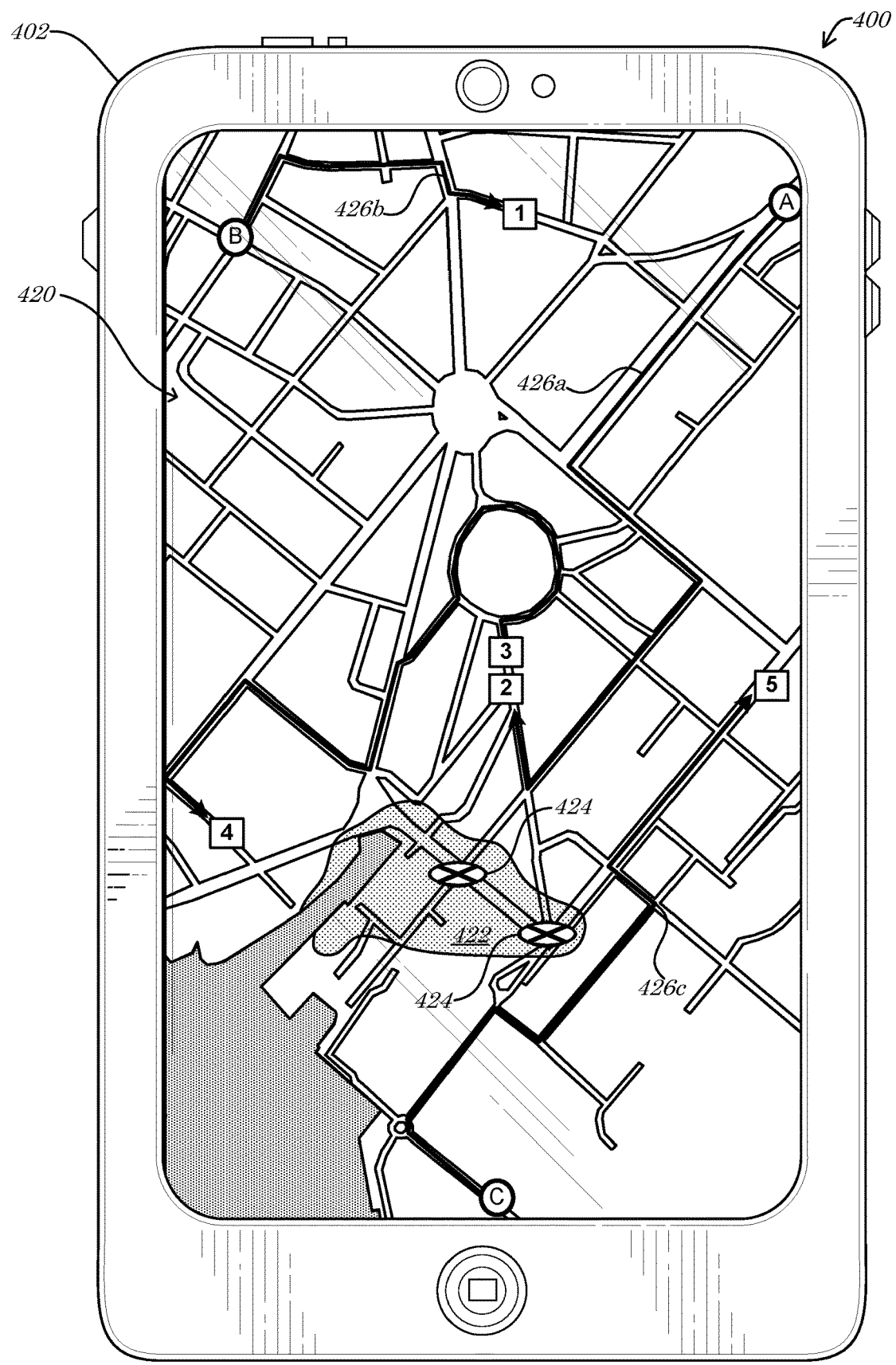
FIG. 4 is a diagram of a system according to some embodiments.

Turning now to FIG. 4, a diagram of a system 400 depicting a user device 402 providing an example interface 420 according to some embodiments is shown. In some embodiments, the interface 420 may comprise a web page, web form, database entry form, Application Programming Interface (API), spreadsheet, table, map interface, and/or application or other Graphical User Interface (GUI) via which a damage analysis and/or response resource and/or a customer (or other entity) may be provided with information defining and/or describing AI-based damage triage data, resource allocation data, resource routing data, and/or resource scheduling data, as described herein. The interface 420 may, for example, comprise a front-end of an AI damage triage and/or dynamic resource allocation, routing, and scheduling program and/or platform programmed and/or otherwise configured to execute, conduct, and/or facilitate the method 600 of FIG. 6 herein, and/or portions thereof. In some embodiments, the interface 420 may be output via a computerized device, such as the user device 402, which may for example, be similar in configuration to one or more of the resource devices 102a-n, 202a-n, the customer devices 106a-n, 206, and/or the AI devices 110, 210 of FIG. 1 and/or FIG. 2 herein.

According to some embodiments, the interface 420 may comprise one or more tabs and/or other segmented and/or logical-presented data forms and/or fields. In some embodiments, the interface 420 may be configured and/or organized to allow and/or facilitate entry of map-based input and/or acquisition of map-based output. As depicted in FIG. 4 for purposes of non-limiting example, the interface 420 may depict a street or roadmap of a particular area. According to some embodiments, the interface 420 may depict (e.g., output indications of) current locations of a plurality of event response resources, as indicated by the circled "A", "B", and "C" designators. In some embodiments, the interface 420 may depict (e.g., output indications of) a plurality of loss locations, as indicated by the boxed "1", "2", "3", "4", and "5" designators. The loss locations may be derived, for example, from image analysis results and/or received communications or indications (e.g., reports of claimed losses being filed). According to some embodiments, the loss locations may coincide with and/or be derived from known locations of customers, clients, account holders, and/or other groups for which descriptive data is pre-stored (e.g., stored prior to a loss event occurrence).

In some embodiments, information descriptive of the loss locations may be stored and/or accessible via the interface 420. A user (not shown) may select one of the boxed designators corresponding to one of the loss locations, for example, and be provided with various details (not shown), such as a date of the reported loss, a type of loss, and/or a damage severity metric. According to some embodiments, such information may be utilized to allocate one or more of the available resources "A", "B", and/or "C" to a particular loss location. In some embodiments, route planning logic may be utilized to determine which available resource is closest to any particular loss location. In the case of a first loss location "1", for example, it may be determined that a first resource "A" is closest and the first resource "A" may accordingly be assigned to the first loss location "1". In some embodiments however, additional and/or different metrics may be utilized to select a resource for allocation to the first loss location "1". It may be determined, for example, that while the first resource "A" is closest to the first loss location "1", that the magnitude of the damage at the first loss location exceeds a predefined threshold of the first resource "A" and/or that the type of damage at the first loss location "1" is a type that the first resource "A" is not trained for. According to some embodiments, it may be determined that the next closest resource, a second resource "B", has a higher experience, training, and/or success metric than the first resource "A" and/or an experience, training/qualification, and/or historic performance level that meets stored requirements for the first loss location "1" (e.g., based on AI object analysis results).

According to some embodiments, transportation object status may be utilized to allocate resources to loss locations. While a third resource "C" may be currently positioned more closely to a second loss location "2" than any other available resource, for example, it may be determined that an area of the map location contains a flooded area 422. AI-based object detection may identify the flooded area 422, for example, and overlay the flooded area 422 on the map of the roadways to identify and/or assign road closures 424. In such a manner, for example, the system 400 may identify and consider dynamic transportation object obstructions when assigning resources to loss locations. Routing may also or alternatively be conducted to maximize efficiency when multiple loss locations are allocated to a single resource.

As depicted in FIG. 4, for example, the first resource "A" may be assigned to each of a second, third, and fourth loss location "2", "3", and "4", respectively and a first route 426a may be plotted from the current location of the first resource "A" to the second loss location "2", then to the third loss location "3", and finally to the fourth loss location "4". In some embodiments, the first resource "A" may be allocated three different loss locations to address/visit because the severity of loss at each location is determined to be low (and accordingly should take less time to asses), because the type of loss at those locations matches a type of loss that the first resource "A" is trained or qualified for or specializes in, and/or because the other resources are unavailable (e.g., based on their respective allocations and schedules). According to some embodiments, one or more of the loss locations may comprise a location of an estimated, expected, likely, or possible loss. The third loss location "3" may comprise a location of a known account holder/customer, for example, that is located proximate to the second loss location "2", which may comprise a location of a reported claim or loss. In some embodiments, as depicted in FIG. 4, the first route 426a may be defined to pass by or to the third loss location "3" so that the first resource "A" may check-in on the third loss location "3", e.g., preemptively, to assess whether there are any losses. In some embodiments, the second resource "B" may be provided with a second route 426b from the current location of the second resource "B" to the first loss location "1".

According to some embodiments, the third resource "C" may be assigned and routed to a fifth loss location "5" via a third route 426c. As depicted in FIG. 4, the third route 426c may be defined to avoid the road closures 424. In some embodiments, the routing of the resources may be utilized to define and/or update schedules for the resources. In the case that the road closures 424 are expected to delay the third resource "C" by half of an hour, for example, any allocated visits on a schedule for the third resource "C" may be pushed back by half of an hour to compensate for the delay. According to some embodiments, routing and/or scheduling may be dynamically adjusted based on site visit performance. In the case that the first resource "A" takes an unexpectedly long time (e.g., stays longer than scheduled) at the third loss location "3" (e.g., because the third loss location "3" was lacking a severity value and/or classification due to being a proactive loss visit), for example, the scheduled time for the fourth loss location "4" may adjusted to account for the delay. In some embodiments, any schedule updates, delays, and/or other information descriptive of the resources, loss locations, route 426a-c, and/or schedules may be provided to any or all of the resources, customers, and/or other users, e.g., via the interface 420 of the user device 402.

While various components of the interface 420 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

III. AI Damage Triage and Resource Allocation, Routing, and Scheduling Data Structures Referring to FIG. 5, a diagram of an example data storage structure 540 according to some embodiments is shown. In some embodiments, the data storage structure 540 may comprise a plurality of data tables, such as a resource table 544a, a schedule table 544b, and/or a claims table 544c. The data tables 544a-c may, for example, be utilized to store, modify, update, retrieve, and/or access various information related to available resources, loss locations, damage, losses, transportation object obstructions, imagery, customers (or other users), and/or insurance accounts. The data tables 544a-c may be utilized in accordance with some embodiments, to conduct AI-based object recognition on location imagery to (i) triage and/or otherwise rank, score, and/or categorize damage and/or (ii) identify and avoid compromised transportation objects and/or segments thereof.

The resource table 544a may comprise, in accordance with some embodiments, a resource IDentifier (ID) field 544a-1, a level field 544a-2, a rating field 544a-3, a location field 544a-4, a route ID field 544a-5, and/or a schedule ID field 544a-6. Any or all of the ID fields 544a-1, 544a-5, 544a-6 may generally store any type of identifier that is or becomes desirable or practicable (e.g., a unique identifier, an alphanumeric identifier, and/or an encoded identifier). As an example of how the example data structure 540 may be utilized in accordance with some embodiments, the resource table 544a may store information relating particular resources (e.g., identified by unique identifiers and/or codes stored in the resource ID field 544a-1) to resource characteristics and/or attributes. The level field 544a-2 may store, for example, data descriptive of an experience level of each resource and/or the rating field 544a-3 may store data descriptive of a rating, qualification, training, or other attribute of the resources' skill, ability, and/or specialties. According to some embodiments, the location field 544a-4 may store data descriptive of a current location of each resource such as a street name, address, postal code, state, country, coordinates, particular building, and/or particular business. The location field 544a-4 may store, for example, any location identifying data that is or becomes known or practicable, such as GPS coordinates, postal addresses, latitude and longitude coordinates, and/or a unique or proprietary certified location identifier. In some embodiments, the route ID field 544a-5 may store an identifier that links to information defining one or more routes assigned to the resources and/or the schedule ID field 544a-6 may store an identifier that links to information defining one or more schedules detailing times, places, and/or details regarding loss locations allocated to the resources.

The schedule table 544b may comprise, in accordance with some embodiments, a schedule ID field 544b-1, a time field 544b-2, a claim ID field 544b-3, and/or a route ID field 544b-4. The schedule ID field 544b-1 may store, for example, a unique identifier for a particular schedule (or time period of a particular schedule) for a particular resource (or resource team; e.g., a shared schedule). According to some embodiments, the time field 544*b*-2 may store a timestamp, date, and/or other chronologically based identifier or descriptor for a particular item, event, or entry in a schedule. In some embodiments, the claim ID field 544*b*-3 may store an identifier that links to information descriptive of a particular claim, loss, and/or loss location on the schedule. According to some embodiments, the route ID field 544*b*-4 may store an identifier that links to information defining a route that includes the specified claim location (e.g., as an origin, destination, or waypoint).

The claim table 544*c* may comprise, in accordance with some embodiments, a claim ID field 544*c*-1, an account ID field 544*c*-2, a reported field 544*c*-3, a status field 544*c*-4, a severity field 544*c*-5, a location field 544*c*-6, and/or a type field 544*c*-7. The claim ID field 544*c*-1 may store an identifier that links to information descriptive of a particular claim, for example, and/or the account ID field 544*c*-2 may store an identifier that links to information descriptive of a particular account, such as an insurance account, financial account, and/or customer or client account. According to some embodiments, the reported field 544*c*-3 may store information regarding when a claim was reported or opened, the status field 544*c*-4 may store information defining or describing a status of the claim, and/or the severity field 544*c*-5 may store information such as a score, rank, and/or other quantitative or qualitative metric descriptive of a magnitude of the loss/damage. In some embodiments, the type field 544*c*-7 may store information descriptive of a classification and/or type of the damage/loss.

In some embodiments, AI-based damage triage and/or resource allocation, routing, and/or scheduling decisions may be defined and/or provided by relationships established between two or more of the data tables 544*a*-*c*. As depicted in the example data storage structure 540, for example, a first relationship "A" may be established between the resource table 544*a* and the schedule table 544*b*. In some embodiments (e.g., as depicted in FIG. 5), the first relationship "A" may be defined by utilizing the route ID field 544*a*-5 as a data key linking to the route ID field 544*b*-4. According to some embodiments, the first relationship "A" may comprise any type of data relationship that is or becomes desirable, such as a one-to-many, many-to-many, or many-to-one relationship. In the case that multiple navigational routes are likely to be applicable to a certain resource, the first relationship "A" may comprise a many-to-one relationship (e.g., many routes per single resource).

According to some embodiments, a second relationship "B" may be established between the resource table 544*a* and the schedule table 544*b*. In some embodiments (e.g., as depicted in FIG. 5), the second relationship "B" may be defined by utilizing the schedule ID field 544*a*-6 as a data key linking to the schedule ID field 544*b*-1. According to some embodiments, the second relationship "B" may comprise any type of data relationship that is or becomes desirable, such as a one-to-many, many-to-many, or many-to-one relationship. In the case that multiple schedule entries are likely to be assigned to a certain resource, the second relationship "B" may comprise a many-to-one relationship (e.g., many schedule events per single resource).

In some embodiments, a third relationship "C" may be established between the schedule table 544*b* and the claim table 544*c*. In some embodiments (e.g., as depicted in FIG. 5), the third relationship "C" may be defined by utilizing the claim ID field 544*b*-3 as a data key linking to the claim ID field 544*c*-1. According to some embodiments, the third relationship "C" may comprise any type of data relationship that is or becomes desirable, such as a one-to-many, many-to-many, or many-to-one relationship. In the case that multiple claims are likely to be associated with different schedule events, the third relationship "C" may comprise a many-to-many relationship.

Utilizing the various relationships, "A", "B", and/or "C", it may accordingly be possible to readily identify for any particular resource any or all assigned claims, routes, and/or scheduled events. As indicated by the example data in the data storage structure 540, a first resource identified by the resource ID "MD-2836" stored in the first data record of the resource table 544*a* may be a "New" resource (e.g., based on the corresponding data stored in the rating field 544*a*-3) located on "Rowe Blvd." (e.g., based on the corresponding data stored in the location field 544*a*-4) and assigned a route having a route ID of "19-8746" (e.g., based on the corresponding data stored in the route ID field 544*a*-5) and a schedule having a schedule ID of "AUG01-H7G5" (e.g., based on the corresponding data stored in the schedule ID field 544*a*-6). Utilizing the first relationship "A" and the second relationship "B" it may be determined that the first resource has five (5) scheduled visits/items in the schedule table 544*b* and the first four (4) events are on or along the route identified by "19-8746". The third relationship "C" may be utilized to determine details for the four (4) different claims that are the first four (4) listed items on the first resource's schedule. In accordance with the example data in the claims table 544*c*, for example, it may be determined that the first two (2) claims are "wind" damages/losses that have a status of having been opened and waiting for resolution for greater than five days (e.g., the "Wait >5" data stored in the second and third rows of the status field 544*c*-4.

In some embodiments, fewer or more data fields than are shown may be associated with the data tables 544*a*-*c*. Only a portion of one or more databases and/or other data stores is necessarily shown in the data storage structure 540 of FIG. 5, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

Figure 6:
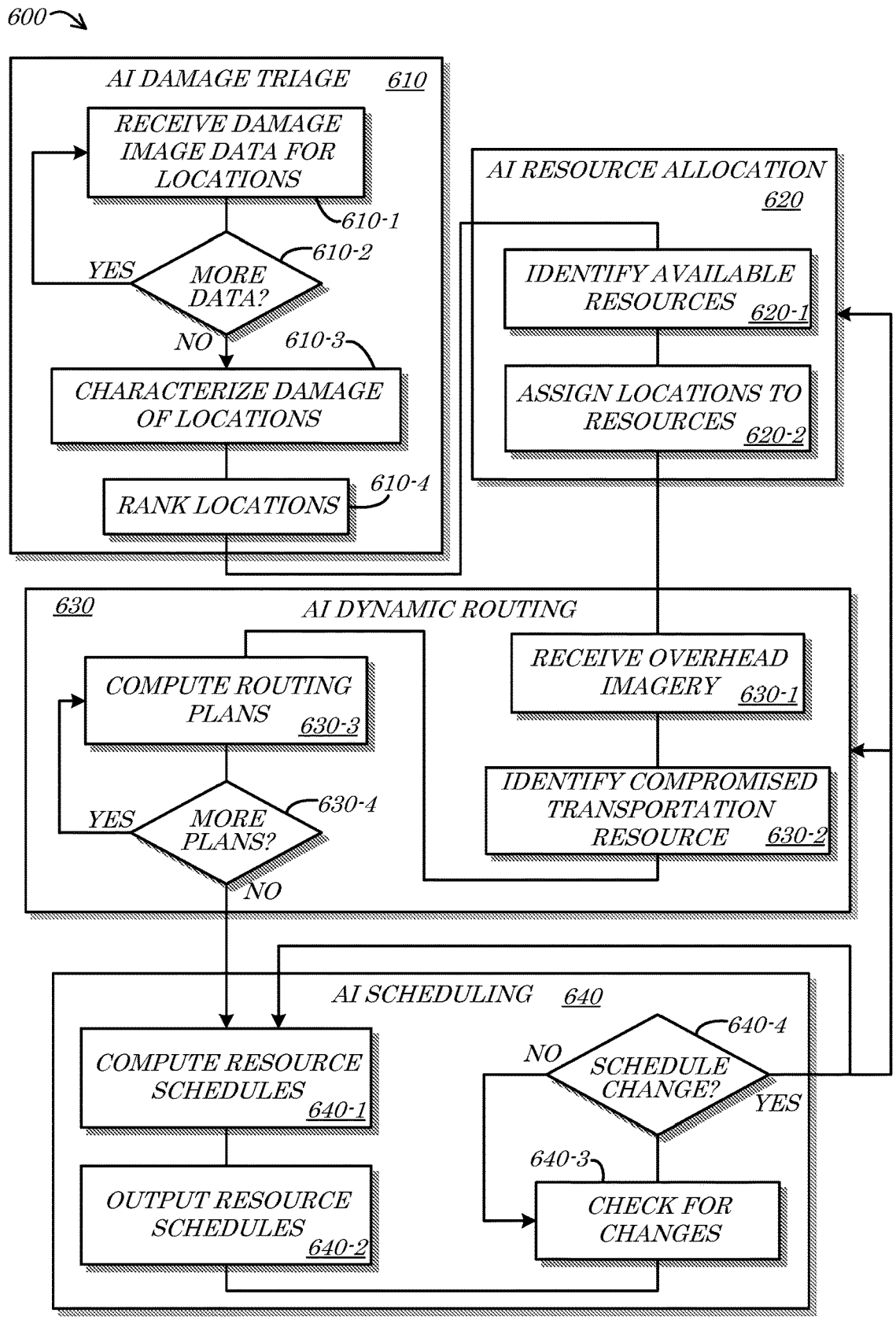
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or specially-programmed computers (e.g., the resource devices 102*a*-*n*, 202*a*-*n*, the user device 402, the customer devices 1026*a*-*n*, 206, the third-party devices 108, 208, and/or the AI devices 110, 210, all of FIG. 1, FIG. 2, and/or FIG. 4 herein), computer terminals, computer servers, computer systems and/or networks, and/or any combinations thereof (e.g., by one or more claim handling mobile devices). In some embodiments, the method 600 may cause an electronic device, such as one of the resource devices 102*a*-*n*, 202*a*-*n* and/or the AI device 110, 210 of FIG. 1 and/or FIG. 2 to perform certain steps and/or commands and/or may cause an outputting and/or management of input/output data via one or more graphical interfaces such as the interface 420, 720 of FIG. 4 and/or FIG. 7 herein.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 140, 240, 540, 740, 840a-e of FIG. 1, FIG. 2, FIG. 5, FIG. 7, FIG. 8A, FIG. 8B, FIG. 8C, FIG. 8D, and/or FIG. 8E herein) may store thereon instructions that when executed by a machine (such as a computerized processor) result in performance according to any one or more of the embodiments described herein.

According to some embodiments, the method 600 may comprise various functional modules, routines, and/or procedures, such as a plurality of AI-based algorithm executions. The method 600 may comprise, for example, AI damage triage 610, AI resource allocation 620, AI dynamic routing 630, and/or AI scheduling 640. In some embodiments, the AI damage triage 610 may comprise receiving (e.g., by an electronic processing device and/or from a remote image capture device) image data for a plurality of locations, at 610-1. The image data may comprise, for example, one or more images (and/or other sensor data) descriptive of damage at a location and/or otherwise generally descriptive of the location. The image data may comprise, in some embodiments, satellite or aerial imagery of a location, such as a town or other geographic area. According to some embodiments, satellite and/or aerial imagery may be received and/or acquired from a third-party source, such as a map server, e.g., the United States Geological Survey (USGS) of Reston, Va. In some embodiments, the image data may comprise images, video, and/or other data acquired or captured by a user device operated by a customer, client, policy holder, and/or other user at or near a particular geographic location. Such image data may comprise, for example, cellphone photos captured by a smartphone of the user and being descriptive of an object at the user's location. The user may capture images of an insured vehicle, home, business, and/or other structure or object, for example, and transmit the images to a centralized AI device, such as a web server in communication with an application executed by the mobile device. According to some embodiments, the image data may be received at various points in time and/or may be descriptive of the location at various points in time. Overhead images and/or object images may be received, for example, both before and after an event, such as a storm. In some embodiments, the method 600 (e.g., the AI damage triage 610) may receive data at 610-1 and may check to determine whether more image data is available, at 610-2. In the case that more image data is determined to be available, needed (e.g., to make an assessment), and/or has been requested, but not yet received for one or more locations, the method 600 may proceed back to 610-1 to receive additional image data. In the case that it is determined that no additional image data is needed, available, incoming, and/or all requested data has been received, the method 600 (e.g., the AI damage triage 610) may proceed to characterize damage (e.g., by the electronic processing device executing an AI object-based triage algorithm) at the locations, at 610-3.

In some embodiments, the received images may be analyzed by one or more object detection and/or identification algorithms, for example, to identify objects of interest (e.g., insured objects, such as homes, structures, and/or vehicles) and to identify any visible damage to those objects. In the case that before and after image data is available, the before and after image data descriptive of an identified object may be compared and contrasted to identify differences in the data. According to some embodiments, any image data descriptive of an object at a location may be analyzed to identify instances of damage, e.g., by comparing the portions of the received image data that correspond to the object to one or more reference images of similar objects (and/or portions thereof). In some embodiments, pattern detection algorithms may be applied to identify common types of damage. Pattern detection analysis may reveal, for example, that a normal or expected shingle pattern on a roof is either missing, disrupted, or is more equivalent to a parallel stick pattern indicative of exposed framing members. In some embodiments, the image analysis may be utilized to classify any identified damage into one or more predefined categories and/or types. Missing roof sections may be classified as "wind damage" for example.

According to some embodiments, the method 600 (e.g., the AI damage triage 610) may comprise ranking (e.g., by the electronic processing device executing the AI object-based triage algorithm) the locations, at 610-4. The damage identified and/or classified at 610-3 may, for example, be analyzed to estimate a magnitude, cost, and/or other quantitative and/or qualitative metric descriptive of the damage. An area of a damaged object and/or a portion of the object identified to be damaged may be utilized, for example, to estimate a repair and/or replacement cost for the object. In some embodiments, such as in the case that multiple damaged objects and/or instances of damage are identified at a single location, the damages, severity metrics, estimated repair and/or replacement value, etc., may be mathematically summed or averaged to define an overall severity metric for the location. According to some embodiments, damage metrics for different locations may be compared by qualitative ranking. The location with the most severe damage and/or the highest estimated cost damage may, for example, be ranked highest, e.g., for prioritized response. In some embodiments, the type of damage may influence or control the ranking and/or weighting of variables utilized to calculate the rankings.

In some embodiments, the method 600 may comprise AI resource allocation 620. The AI resource allocation 620 may comprise, for example, identifying (e.g., by the electronic processing device executing an AI resource allocation algorithm) available resources, at 620-1. A database storing personnel and/or equipment or supplies data, such as locations, types, characteristics, contact information, etc., may, for example, be accessed to initiate a geo-specific query. One or more location identifiers associated with the loss locations (e.g., claim locations) may be utilized to identify a subset of resources that are within a predetermined threshold distance of an affected area, such as a storm impact area, for example. According to some embodiments, a pool of resources may be selected based on their status, location, and/or qualifications or other attributes. In some embodiments, the method 600 (e.g., the AI resource allocation 620) may also or alternatively comprise assigning (e.g., by the electronic processing device executing the AI resource allocation algorithm) locations to resources, at 620-2. According to some embodiments, the severity, type, and/or rankings of the locations (and/or associated objects and/or damage thereof) may be utilized to assign specific resources to the loss locations. The most experienced, highly trained, and/or proficient damage analysis personnel may be assigned to the most severe (e.g., highest ranked) loss locations, for example, and/or resources with specific training or skills, such as estimating water damage in homes, may be assigned to corresponding locations based on their qualifications/attributes. In some embodiments, travel distance estimates based on a comparison of loss locations to resource locations may be utilized to assign resources to locations that are nearby and/or easily accessed.

According to some embodiments, the method 600 may comprise AI dynamic routing 630. The AI dynamic routing 630 may comprise, for example, receiving (e.g., by the electronic processing device and/or from a remote image capture device) overhead imagery, at 630-1. The imagery may, for example, be descriptive of a specific geographic area (e.g., a storm impact area) selected from a plurality of available geographic areas for which imagery is stored and/or available. In some embodiments, the imagery may be acquired based on the damage image data received at 610-1 and/or based on locations of the resources allocated at 620-2. In some embodiments, the image data may comprise any type and/or quantity of image, video, and/or sensor data that is or becomes available or practicable. According to some embodiments, the method 600 (e.g., the AI dynamic routing 630) may comprise identifying (e.g., by the electronic processing device executing an AI object-based routing algorithm) a compromised transportation resource, at 630-2. The overhead image data may be analyzed and/or compared to street, road, and/or other transportation maps, for example, to identify areas that may be impassible due to downed trees, powerlines, flooding, etc.

In some embodiments, the method 600 (e.g., the AI dynamic routing 630) may comprise computing (e.g., by the electronic processing device executing an AI navigational routing algorithm) route plans, at 630-3. In some embodiments, initial route plans (e.g., utilized to estimate travel times) from the AI resource allocation 620 may be utilized as a starting point for analyzing route integrity for each route assigned to each allocated resource. According to some embodiments, each initial route plan may be compared to locations identified for compromised transportation resources to determine whether a route needs to be adjusted. Navigational routing algorithms may be modified to exclude (e.g., detour around) identified obstructions, for example, and revised travel times and routes may be calculated. According to some embodiments, the method 600 (e.g., the AI dynamic routing 630) may comprise determining whether more route plans require calculation or updating, at 630-4. In the case that additional imagery is received and/or additional compromised resources are identified, for example, the method 600 may proceed back to calculate route plans at 630-3. In some embodiments, the receiving or retrieving of image data at 630-1, the identifying of compromised transportation resources at 630-2, and/or the calculating/updating of route plans at 630-3 may be conducted on a looping or repetitive basis, such as every five (5) minutes, to dynamically refresh estimated travel times and suggested routes for allocated resources to reach their assigned loss locations.

According to some embodiments, such as in the case that additional route plans do not need to be computed (or do not require calculating at the present time) the method 600 may proceed to AI scheduling 640. The method 600 (e.g., the AI scheduling 640) may comprise, for example, computing (e.g., by the electronic processing device executing an AI scheduling algorithm) resource schedules, at 640-1. A listing of the loss locations assigned (e.g., at 620-2) to each resource may, for example, be utilized to define a schedule or site visit plan for the resource. In some embodiments, the attributes of the resource and/or the loss location (or damage thereof) may be utilized to implement time-based planning to the schedule. The severity or ranking of the damage at a loss location may be correlated to an estimated time to asses and/or address the location, for example, by automatic cross-referencing to a chart of estimated handling times and damage magnitudes, ranking, and/or rankings or types. Locations having severe and/or large dollar amount estimated repair costs may, for example, be estimated to consume three (3) hours of a resource's time, while minor or lesser damage occurrences may be estimated to consume half an hour of time. In some embodiments, the routing data (e.g., from 630-3) may be utilized to estimate an amount of time needed between appointments on the schedule. The schedule may be defined, for example, by adding an estimated visit time plus an estimated travel time to a start time of a first appointment, thereby setting a start time for a second appointment. Such a process may be repeated for each allocated loss location visit for any given allocated resource.

In some embodiments, the method 600 (e.g., the AI scheduling 640) may comprise outputting the resource schedules, at 640-2. In the case that the AI scheduling 640 is conducted and/or managed through a mobile device application, for example, the mobile device application may cause one or more schedules (and/or routes or other pertinent information) to be displayed via a display device and/or interface of the device. According to some embodiments, an AI device, such as a centralized or remote server, may send a signal to the remote device defining an interface and/or causing the device to output an interface that includes schedule information. In such a manner, for example, a damage analysis resource employee or agent may readily view and/or update their schedule of allocated loss location visits/tasks. Similarly, a customer device may be utilized to update a customer/user associated with a particular loss location regarding an estimated time of arrival, current location, contact information, etc., of a resource assigned to the loss location. In some embodiments, the method 600 (e.g., the AI scheduling 640) may comprise checking for changes to schedules, at 640-3. Resource locations, progress, input, route updates, etc., may be utilized, for example, to determine if a schedule for a resource needs to be checked for updates. According to some embodiments, the checking may comprise a software listener module that is triggered by the occurrence of certain predefined events, such as a resource staying longer than estimated/scheduled at an appointment, a resource skipping an appointment or visiting appointments out of order, and/or a resource visiting a location assigned to a different resource. In some embodiments, it may be determined whether changes are needed, at 640-4. In the case that changes are determined to be needed, the method 600 may loop back to reassigning or reallocating resources at 620-2 (and/or recomputing route plans at 630-3 and/or recomputing schedules at 640-1). In the case that no changes are determined to be necessary, the method 600 may loop back to periodic, constant, and/or scheduled checking for updates at 640-3. In such a manner, for example, the method 600 may dynamically readjust resource allocations, routes, and/or schedules based on occurrences, such as changes in resource availability, changes to scheduled times, changes to estimated travel times, changes to transportation resources, etc.

Figure 7:
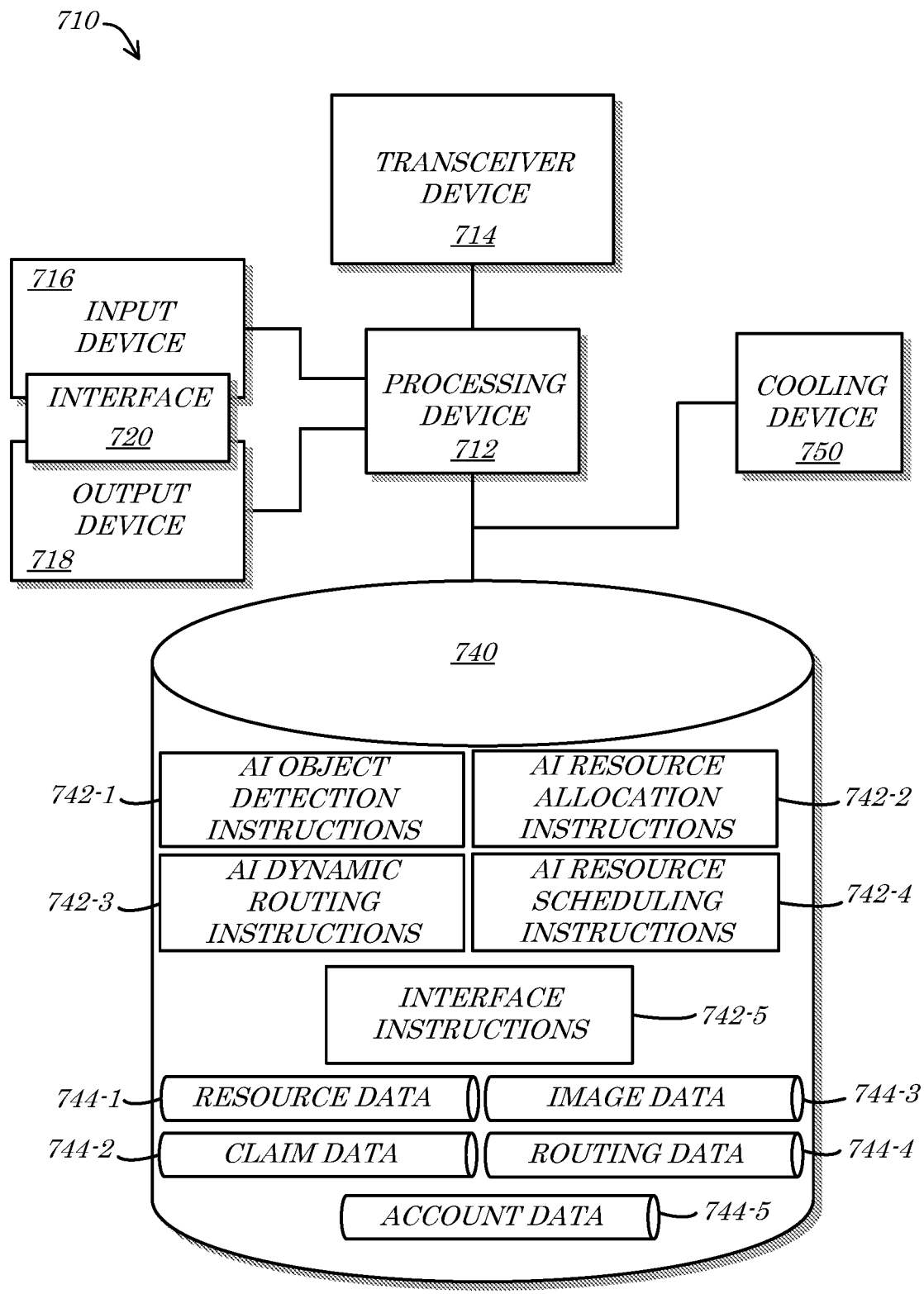
FIG. 7 is a block diagram of an apparatus according to some embodiments.
Figure 8A:
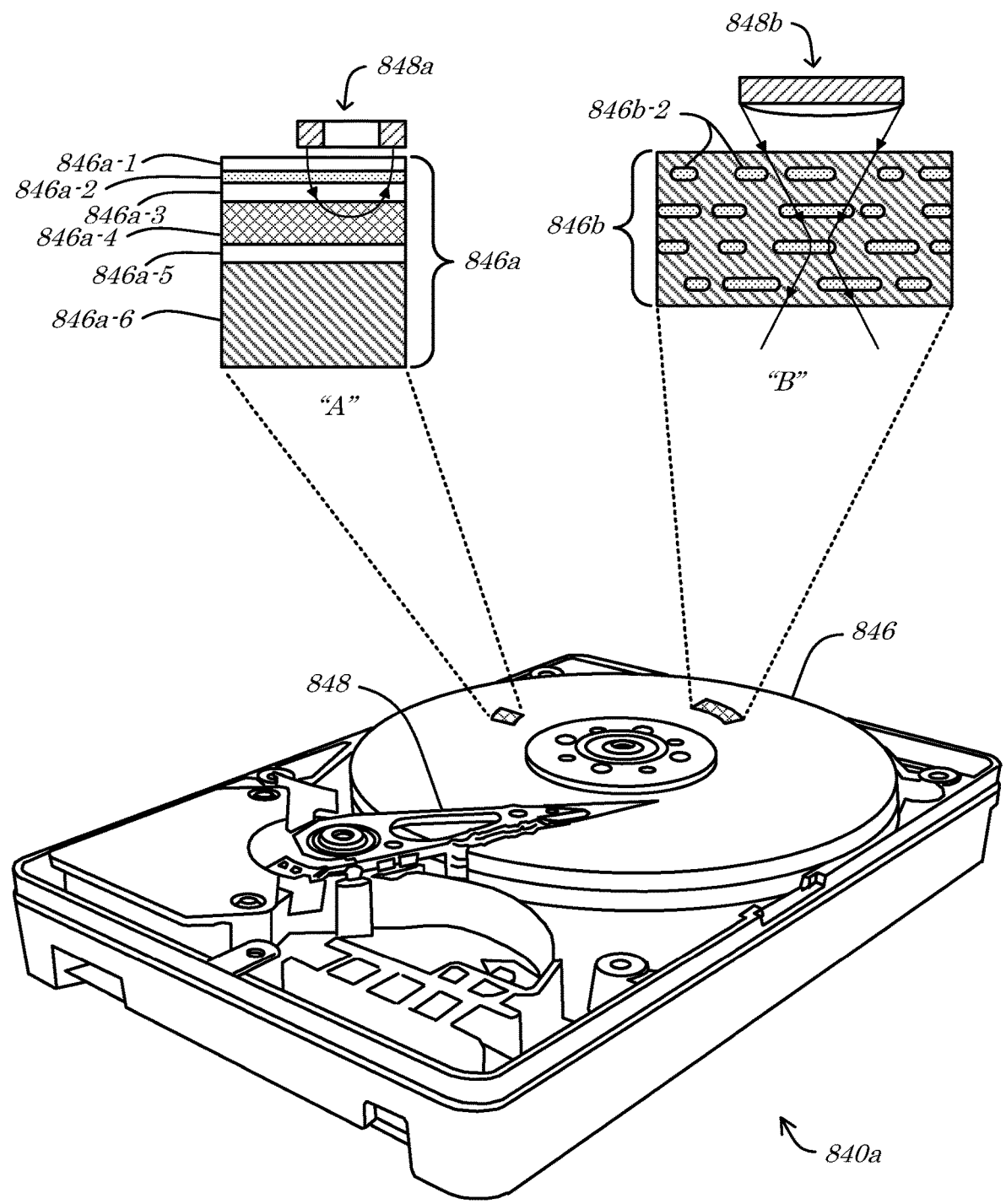
FIG. 8A, FIG. 8B, FIG. 8C, FIG. 8D, and FIG. 8E are perspective diagrams of exemplary data storage devices according to some embodiments.
Figure 8B:
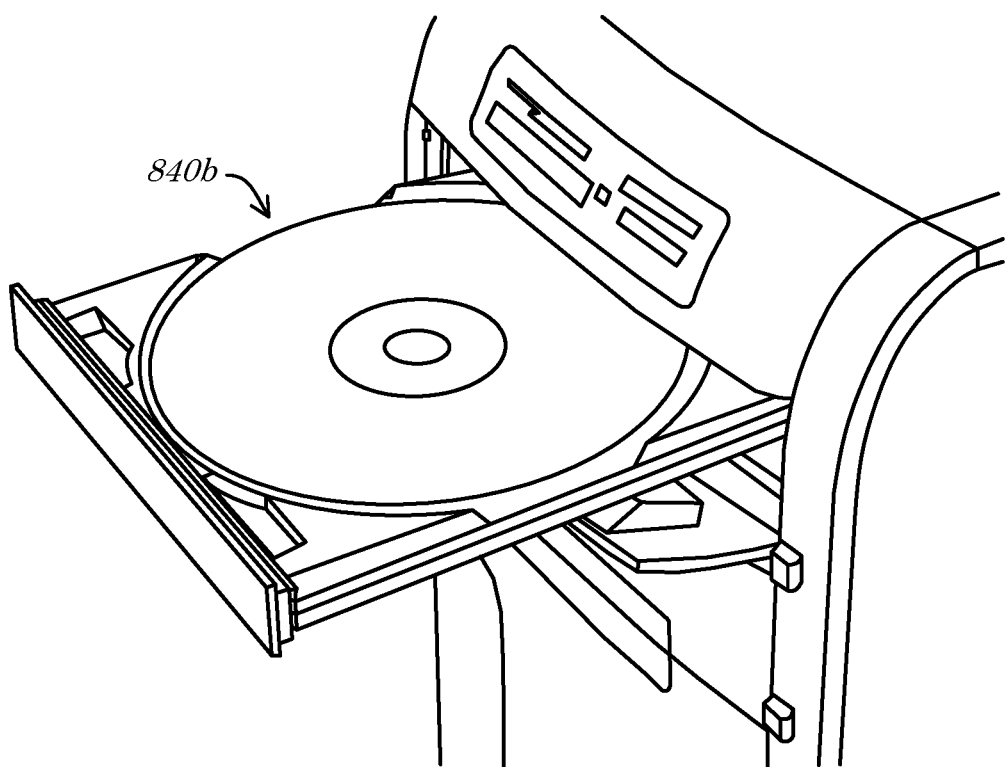
Figure 8C:
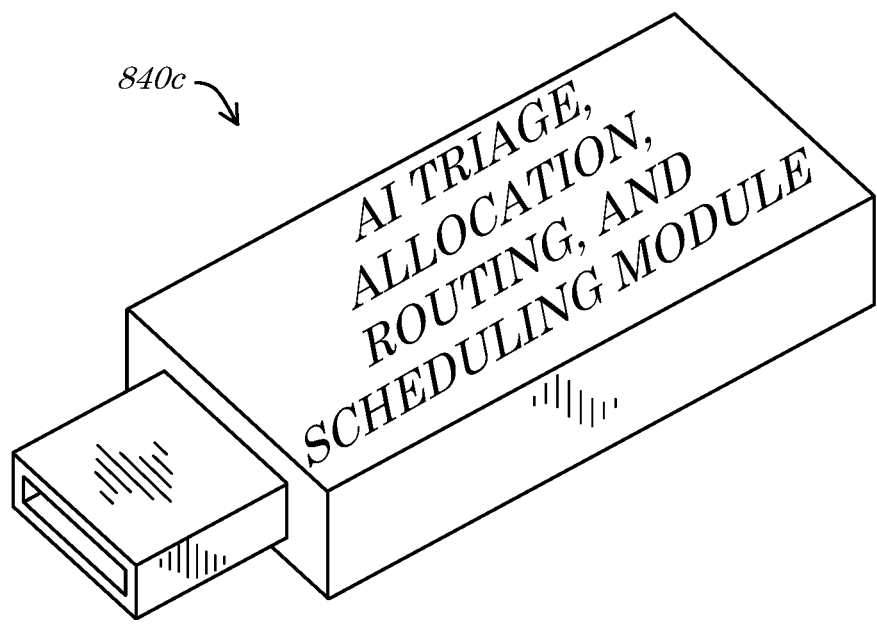
Figure 8D:
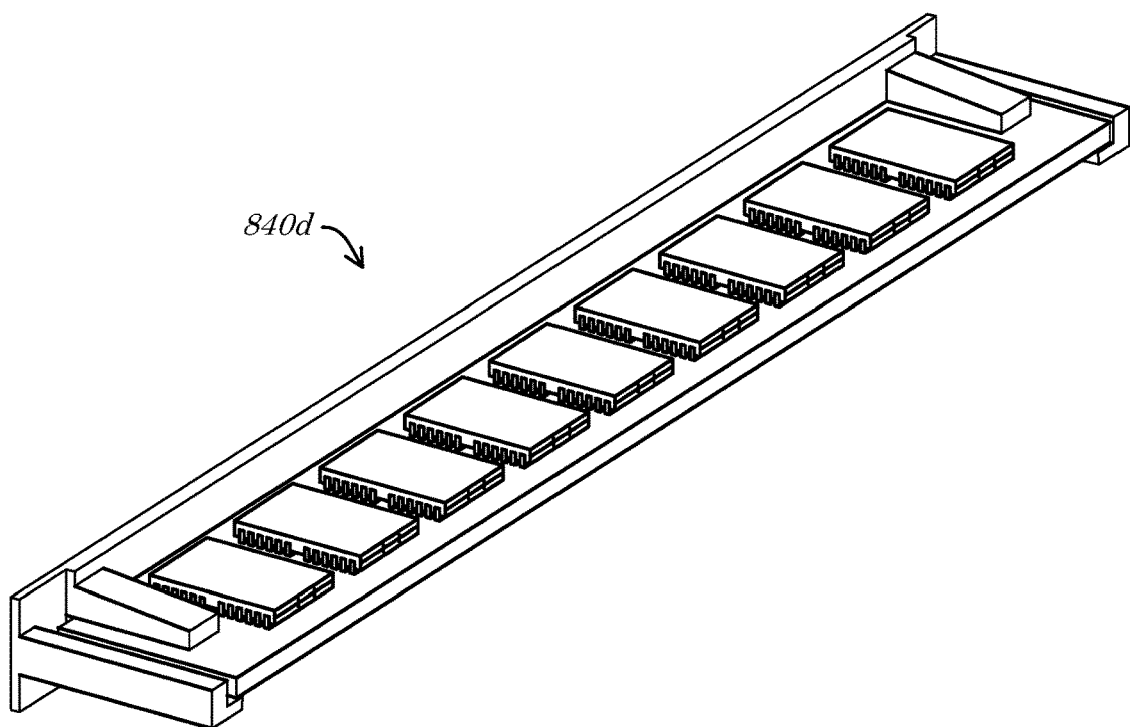
Figure 8E:
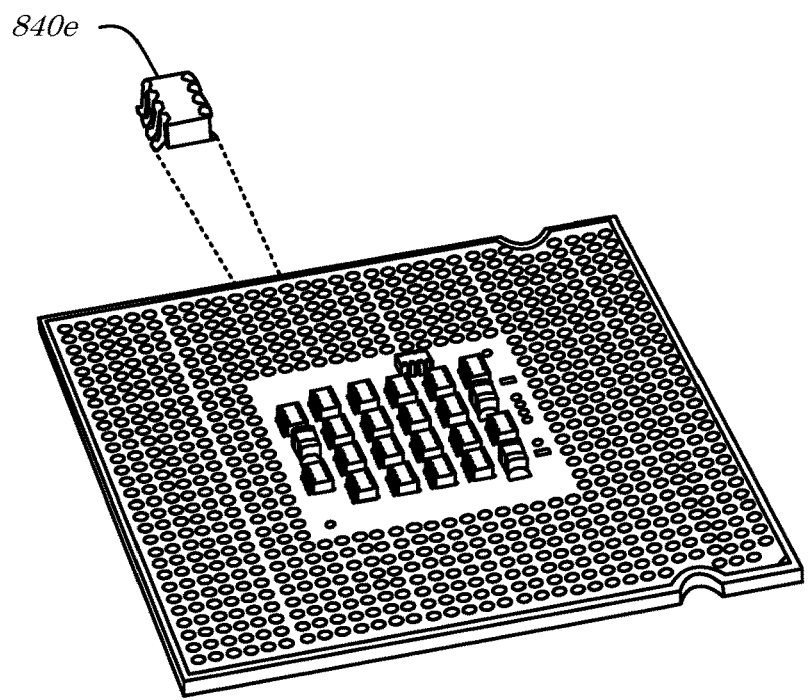

Turning to FIG. 7, a block diagram of an apparatus 710 according to some embodiments is shown. In some embodiments, the apparatus 710 may be similar in configuration and/or functionality to any of the AI devices 110, 210, the resource devices 102*a-n*, 202*a-n*, the customer devices 106*a-n*, 206, the user device 402, and/or the third-party devices 106, 206, all of FIG. 1, FIG. 2, and/or FIG. 4 herein. The apparatus 710 may, for example, execute, process, facilitate, and/or otherwise be associated with the method 600 of FIG. 6 herein, and/or portions thereof. In some embodiments, the apparatus 710 may comprise a processing device 712, a transceiver device 714, an input device 716, an output device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 be included in the apparatus 710 without deviating from the scope of embodiments described herein.

According to some embodiments, the processor 712 may be or include any type, quantity, and/or configuration of processor that is or becomes known. The processor 712 may comprise, for example, an Intel® IXP 2800 network processor or an Intel® XEON™ Processor coupled with an Intel® E7501 chipset. In some embodiments, the processor 712 may comprise multiple inter-connected processors, microprocessors, and/or micro-engines. According to some embodiments, the processor 712 (and/or the apparatus 710 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 710 comprises a server such as a blade server, necessary power may be supplied via a standard AC outlet, power strip, surge protector, and/or Uninterruptible Power Supply (UPS) device.

In some embodiments, the transceiver device 714 may comprise any type or configuration of communication device that is or becomes known or practicable. The transceiver device 714 may, for example, comprise a Network Interface Card (NIC), a telephonic device, a cellular network device, a router, a hub, a modem, and/or a communications port or cable. In some embodiments, the transceiver device 714 may be coupled to receive sensor data from one or more sensors (not separately depicted), such as in the case that the apparatus 710 is utilized to analyze video/images and/or other data. The transceiver device 714 may, for example, comprise a BLE and/or RF receiver device that acquires broadcast and/or transmitted sensor data and/or a transmitter device that provides such data to a remote server (not shown). According to some embodiments, the transceiver device 714 may also or alternatively be coupled to the processor 712. In some embodiments, the transceiver device 714 may comprise an IR, RF, Bluetooth™, Near-Field Communication (NFC), and/or Wi-Fi® network device coupled to facilitate communications between the processor 712 and another device (such as a mobile resource and/or customer device, not shown in FIG. 7).

In some embodiments, the input device 716 and/or the output device 718 are communicatively coupled to the processor 712 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., by an insurance customer and/or damage analysis resource). In some embodiments, the input device 716 may comprise a sensor, such as a receiver, a camera, a proximity sensor, a signal strength meter, etc. The output device 718 may, according to some embodiments, comprise a display screen and/or other practicable output component and/or device. The output device 718 may, for example, provide the interface 720 (such as the interface 420 of FIG. 4 herein) via which AI damage triage and/or AI resource allocation, routing, and/or scheduling functionality are provided to a user (e.g., via a website and/or mobile application). According to some embodiments, the input device 716 and/or the output device 718 may comprise and/or be embodied in a single device such as a touch-screen monitor.

The memory device 740 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of AI object detection instructions 742-1, AI resource allocation instructions 742-2, AI dynamic routing instructions 742-3, AI resource scheduling instructions 742-4, interface instructions 742-5, resource data 744-1, claim data 744-2, image data 744-3, routing data 744-4, and/or account data 744-5. In some embodiments, the AI object detection instructions 742-1, AI resource allocation instructions 742-2, AI dynamic routing instructions 742-3, AI resource scheduling instructions 742-4, and interface instructions 742-5 may be utilized by the processor 712 to provide output information via the output device 718 and/or the transceiver device 714.

According to some embodiments, the AI object detection instructions 742-1 may be operable to cause the processor 712 to process the resource data 744-1, claim data 744-2, image data 744-3, routing data 744-4, and/or account data 744-5 in accordance with embodiments as described herein. Resource data 744-1, claim data 744-2, image data 744-3, routing data 744-4, and/or account data 744-5 received via the input device 716 and/or the transceiver device 714 may, for example, be analyzed, sorted, filtered, decoded, decompressed, ranked, scored, plotted, and/or otherwise processed by the processor 712 in accordance with the AI object detection instructions 742-1. In some embodiments, resource data 744-1, claim data 744-2, image data 744-3, routing data 744-4, and/or account data 744-5 may be fed by the processor 712 through one or more mathematical and/or statistical formulas and/or models in accordance with the AI object detection instructions 742-1 to detect, identify, classify, rank, and/or otherwise evaluate objects in images/video/sensor data, as described herein.

In some embodiments, the AI resource allocation instructions 742-2 may be operable to cause the processor 712 to process the resource data 744-1, claim data 744-2, image data 744-3, routing data 744-4, and/or account data 744-5 in accordance with embodiments as described herein. Resource data 744-1, claim data 744-2, image data 744-3, routing data 744-4, and/or account data 744-5 received via the input device 716 and/or the transceiver device 714 may, for example, be analyzed, sorted, filtered, decoded, decompressed, ranked, scored, plotted, and/or otherwise processed by the processor 712 in accordance with the AI resource allocation instructions 742-2. In some embodiments, resource data 744-1, claim data 744-2, image data 744-3, routing data 744-4, and/or account data 744-5 may be fed by the processor 712 through one or more mathematical and/or statistical formulas and/or models in accordance with the AI resource allocation instructions 742-2 to dynamically allocate and/or assign response resources to loss locations, as described herein.

According to some embodiments, the AI dynamic routing instructions 742-3 may be operable to cause the processor 712 to process the resource data 744-1, claim data 744-2, image data 744-3, routing data 744-4, and/or account data 744-5 in accordance with embodiments as described herein. Resource data 744-1, claim data 744-2, image data 744-3, routing data 744-4, and/or account data 744-5 received via the input device 716 and/or the transceiver device 714 may, for example, be analyzed, sorted, filtered, decoded, decompressed, ranked, scored, plotted, and/or otherwise processed by the processor 712 in accordance with the AI dynamic routing instructions 742-3. In some embodiments, resource data 744-1, claim data 744-2, image data 744-3, routing data 744-4, and/or account data 744-5 may be fed by the processor 712 through one or more mathematical and/or statistical formulas and/or models in accordance with the AI dynamic routing instructions 742-3 to generate, define, and/or update navigational routing based on AI-based object detection of transportation resources, as described herein.

In some embodiments, the AI resource scheduling instructions 742-4 may be operable to cause the processor 712 to process the resource data 744-1, claim data 744-2, image data 744-3, routing data 744-4, and/or account data 744-5 in accordance with embodiments as described herein. Resource data 744-1, claim data 744-2, image data 744-3, routing data 744-4, and/or account data 744-5 received via the input device 716 and/or the transceiver device 714 may, for example, be analyzed, sorted, filtered, decoded, decompressed, ranked, scored, plotted, and/or otherwise processed by the processor 712 in accordance with the AI resource scheduling instructions 742-4. In some embodiments, resource data 744-1, claim data 744-2, image data 744-3, routing data 744-4, and/or account data 744-5 may be fed by the processor 712 through one or more mathematical and/or statistical formulas and/or models in accordance with the AI resource scheduling instructions 742-4 to dynamically schedule and/or reschedule resource site visits, as described herein In some embodiments, the interface instructions 742-5 may be operable to cause the processor 712 to process the resource data 744-1, claim data 744-2, image data 744-3, routing data 744-4, and/or account data 744-5 in accordance with embodiments as described herein. Resource data 744-1, claim data 744-2, image data 744-3, routing data 744-4, and/or account data 744-5 received via the input device 716 and/or the transceiver device 714 may, for example, be analyzed, sorted, filtered, decoded, decompressed, ranked, scored, plotted, and/or otherwise processed by the processor 712 in accordance with the interface instructions 742-5. In some embodiments, resource data 744-1, claim data 744-2, image data 744-3, routing data 744-4, and/or account data 744-5 may be fed by the processor 712 through one or more mathematical and/or statistical formulas and/or models in accordance with the interface instructions 742-5 to provide the interface 720 (e.g., such as the interface 420 of FIG. 4 herein) via which input and/or output descriptive of loss events and/or insurance claims, allocated resources, assigned routes, and/or scheduled visits, may be captured and/or provided, as described herein.

According to some embodiments, the apparatus 710 may comprise the cooling device 750. According to some embodiments, the cooling device 750 may be coupled (physically, thermally, and/or electrically) to the processor 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

Referring to FIG. 8A, FIG. 8B, FIG. 8C, FIG. 8D, and FIG. 8E, perspective diagrams of exemplary data storage devices 840*a-e* according to some embodiments are shown. The data storage devices 840*a-e* may, for example, be utilized to store instructions and/or data such as the AI object detection instructions 742-1, AI resource allocation instructions 742-2, AI dynamic routing instructions 742-3, AI resource scheduling instructions 742-4, interface instructions 742-5, resource data 744-1, claim data 744-2, image data 744-3, routing data 744-4, and/or account data 744-5, each of which is presented in reference to FIG. 7 herein. In some embodiments, instructions stored on the data storage devices 840*a-e* may, when executed by a processor, cause the implementation of and/or facilitate the method 600 of FIG. 6 herein, and/or portions thereof.

According to some embodiments, the first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 846, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 848*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, the second data storage device 840*b* may comprise a CD, CD-ROM, DVD, Blu-Ray™ Disc, and/or other type of optically-encoded disk and/or other storage medium that is or becomes know or practicable. In some embodiments, the third data storage device 840*c* may comprise a USB keyfob, dongle, and/or other type of flash memory data storage device that is or becomes know or practicable. In some embodiments, the fourth data storage device 840*d* may comprise RAM of any type, quantity, and/or configuration that is or becomes practicable and/or desirable. In some embodiments, the fourth data storage device 840*d* may comprise an off-chip cache such as a Level 2 (L2) cache memory device. According to some embodiments, the fifth data storage device 840*e* may comprise an on-chip memory device such as a Level 1 (L1) cache memory device.

The data storage devices 840*a-e* may generally store program instructions, code, and/or modules that, when executed by a processing device cause a particular machine to function in accordance with one or more embodiments described herein. The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system for utilizing Artificial Intelligence (AI) for dynamically triaging and handling damage analysis for a plurality of different geographic locations, comprising:
an electronic transceiver device;
an electronic processing device in communication with the electronic transceiver device; and
a non-transitory memory device storing (i) AI image analysis logic, (ii) resource allocation rules, (iii) navigational routing rules, (iv) scheduling rules, (v) damage analysis resources information, and (vi) operating instructions that when executed by the electronic processing device, result in:
receiving, via the electronic transceiver device and from each of a plurality of remote electronic user devices situated in a geographic area, (i) an image descriptive of damage to an object at a geographic location of the respective remote electronic user device and (ii) location data defining a distinct geographic location of the respective remote electronic user device, wherein the location data defining the distinct geographic location of each respective remote electronic user device comprises at least one of GPS coordinates and latitude and longitude coordinates;
computing, by an execution of the AI image analysis logic by the electronic processing device, and for each received image, an estimated value for a characteristic of the damage;
ranking, by the electronic processing device, the locations of the damaged objects from highest to lowest based on the computed estimated values for the characteristic of the damage;
identifying, by the electronic processing device and utilizing the damage analysis resources information, a pool of available damage analysis resources, each damage analysis resource corresponding to a unique damage analysis resource identifier stored in a database;
assigning, by an execution of the resource allocation rules by the electronic processing device, a plurality of the distinct geographic locations of the damaged objects to each of the available damage analysis resources;
receiving, via the electronic transceiver device, an overhead image of the geographic area;
identifying, by an execution of the AI image analysis logic by the electronic processing device, and based on the overhead image of the geographic area, at least one blocked road in the geographic area;
computing, by an execution of the navigational routing rules by the electronic processing device, and based on the identifying of the at least one blocked road in the geographic area, and for each available damage analysis resource, a routing plan for the assigned distinct geographic locations of the damaged objects, each routing plan being assigned a unique routing identifier stored in the database in relation to at least one of the unique damage analysis resource identifiers;
computing, by an execution of the scheduling rules by the electronic processing device, and based on the computed routing plan, and for each available damage analysis resource, a damage analysis schedule;
transmitting, via the electronic transceiver device and to each of the available damage analysis resources, and based on a retrieval of at least one of the unique routing identifiers from the database utilizing the corresponding unique damage analysis resource identifier, graphical information descriptive of the respective routing plan and damage analysis schedule; and
dynamically recomputing, by an execution of the scheduling rules by the electronic processing device, and based on a change in at least one of a resource availability, a scheduled time, an estimated travel times, and a transportation resource, and for at least one of the available damage analysis resources, an updated damage analysis schedule.

2. The system for utilizing AI for dynamically triaging and handling damage analysis for the plurality of different geographic locations of claim 1, wherein the estimated value for the characteristic of the damage comprises an estimated value indicative of a magnitude of the damage.

3. The system for utilizing AI for dynamically triaging and handling damage analysis for the plurality of different geographic locations of claim 2, wherein the estimated value indicative of the magnitude of the damage comprises an estimated repair cost.

4. The system for utilizing AI for dynamically triaging and handling damage analysis for the plurality of different geographic locations of claim 1, wherein the estimated value for the characteristic of the damage comprises an estimated value indicative of a type of the damage.

5. The system for utilizing AI for dynamically triaging and handling damage analysis for the plurality of different geographic locations of claim 1, wherein the damage analysis resources information comprises information descriptive of at least one of: (i) a current geographic location of each damage analysis resource and (ii) a skill level of each damage analysis resource.

6. The system for utilizing AI for dynamically triaging and handling damage analysis for the plurality of different geographic locations of claim 5, wherein the resource allocation rules define criteria for allocating the damage analysis resources based on the current geographic locations of the damage analysis resources and the skill levels of the damage analysis resources.

7. The system for utilizing AI for dynamically triaging and handling damage analysis for the plurality of different geographic locations of claim 5, wherein the skill level of each damage analysis resource comprises a peer rating.

8. The system for utilizing AI for dynamically triaging and handling damage analysis for the plurality of different geographic locations of claim 5, wherein the skill level of each damage analysis resource is defined based upon an historic performance statistic.

9. The system for utilizing AI for dynamically triaging and handling damage analysis for the plurality of different geographic locations of claim 1, wherein the operating instructions, when executed by the electronic processing device, further result in:

receiving, via the electronic transceiver device and from a first one of the damage analysis resources, an indication of a deviation from the respective damage analysis schedule for the first one of the damage analysis resources;

reassigning at least one of the plurality of the geographic locations of the damaged objects originally assigned to the first one of the damage analysis resources to a second one of the damage analysis resources;

computing, by an execution of the navigational routing rules by the electronic processing device, and based on the identifying of the at least one blocked road in the geographic area, and for each of the first and second available damage analysis resources, an updated routing plan;

computing, by an execution of the scheduling rules by the electronic processing device, and based on the computed updated routing plans, and for each of the first and second available damage analysis resources, an updated damage analysis schedule; and transmitting, via the electronic transceiver device and to each of the first and second available damage analysis resources, graphical information descriptive of the respective updated routing plan and updated damage analysis schedule.

10. A method for utilizing Artificial Intelligence (AI) for dynamically triaging and handling damage analysis for a plurality of different geographic locations, comprising:

receiving, via an electronic transceiver device and from each of a plurality of remote electronic user devices situated in a geographic area, (i) an image descriptive of damage to an object at a geographic location of the respective remote electronic user device and (ii) location data defining a distinct geographic location of the respective remote electronic user device, wherein the location data defining the distinct geographic location of each respective remote electronic user device comprises at least one of GPS coordinates and latitude and longitude coordinates;

computing, by an execution of AI image analysis logic stored by a non-transitory memory device, and by an electronic processing device in communication with the electronic transceiver device, and for each received image, an estimated value for a characteristic of the damage;

ranking, by the electronic processing device, the locations of the damaged objects from highest to lowest based on the computed estimated values for the characteristic of the damage;

identifying, by the electronic processing device and utilizing damage analysis resources information stored by the non-transitory memory device, a pool of available damage analysis resources, each damage analysis resource corresponding to a unique damage analysis resource identifier stored in a database;

assigning, by an execution of resource allocation rules stored by the non-transitory memory device, and by the electronic processing device, a plurality of the distinct geographic locations of the damaged objects to each of the available damage analysis resources;

receiving, via the electronic transceiver device, an overhead image of the geographic area;

identifying, by an execution of the AI image analysis logic by the electronic processing device, and based on the overhead image of the geographic area, at least one blocked road in the geographic area;

computing, by an execution of navigational routing rules stored by the non-transitory memory device, and by the electronic processing device, and based on the identifying of the at least one blocked road in the geographic area, and for each available damage analysis resource, a routing plan for the assigned distinct geographic locations of the damaged objects, each routing plan being assigned a unique routing identifier stored in the database in relation to at least one of the unique damage analysis resource identifiers;

computing, by an execution of scheduling rules stored by the non-transitory memory device, and by the electronic processing device, and based on the computed routing plan, and for each available damage analysis resource, a damage analysis schedule;

transmitting, via the electronic transceiver device and to each of the available damage analysis resources, and based on a retrieval of at least one of the unique routing identifiers from the database utilizing the corresponding unique damage analysis resource identifier, graphical information descriptive of the respective routing plan and damage analysis schedule; and dynamically recomputing, by an execution of the scheduling rules by the electronic processing device, and based on a change in at least one of a resource availability, a scheduled time, an estimated travel times, and a transportation resource, and for at least one of the available damage analysis resources, an updated damage analysis schedule.

11. The method for utilizing AI for dynamically triaging and handling damage analysis for the plurality of different geographic locations of claim 10, wherein the estimated value for the characteristic of the damage comprises an estimated value indicative of a magnitude of the damage.

12. The method for utilizing AI for dynamically triaging and handling damage analysis for the plurality of different geographic locations of claim 11, wherein the estimated value indicative of the magnitude of the damage comprises an estimated repair cost.

13. The method for utilizing AI for dynamically triaging and handling damage analysis for the plurality of different geographic locations of claim 10, wherein the estimated value for the characteristic of the damage comprises an estimated value indicative of a type of the damage.

14. The method for utilizing AI for dynamically triaging and handling damage analysis for the plurality of different geographic locations of claim 10, wherein the damage analysis resources information comprises information descriptive of at least one of: (i) a current geographic location of each damage analysis resource and (ii) a skill level of each damage analysis resource.

15. The method for utilizing AI for dynamically triaging and handling damage analysis for the plurality of different geographic locations of claim 14, wherein the resource allocation rules define criteria for allocating the damage analysis resources based on the current geographic locations of the damage analysis resources and the skill levels of the damage analysis resources.

16. The method for utilizing AI for dynamically triaging and handling damage analysis for the plurality of different geographic locations of claim 14, wherein the skill level of each damage analysis resource comprises a peer rating.

17. The method for utilizing AI for dynamically triaging and handling damage analysis for the plurality of different geographic locations of claim 14, wherein the skill level of each damage analysis resource is defined based upon an historic performance statistic.

18. The method for utilizing AI for dynamically triaging and handling damage analysis for the plurality of different geographic locations of claim 10, further comprising:

receiving, via the electronic transceiver device and from a first one of the damage analysis resources, an indication of a deviation from the respective damage analysis schedule for the first one of the damage analysis resources;

reassigning at least one of the plurality of the geographic locations of the damaged objects originally assigned to the first one of the damage analysis resources to a second one of the damage analysis resources;

computing, by an execution of the navigational routing rules by the electronic processing device, and based on the identifying of the at least one blocked road in the geographic area, and for each of the first and second available damage analysis resources, an updated routing plan;

computing, by an execution of the scheduling rules by the electronic processing device, and based on the computed updated routing plans, and for each of the first and second available damage analysis resources, an updated damage analysis schedule; and transmitting, via the electronic transceiver device and to each of the first and second available damage analysis resources, graphical information descriptive of the respective updated routing plan and updated damage analysis schedule.

19. The method for utilizing AI for dynamically triaging and handling damage analysis for the plurality of different geographic locations of claim 10, wherein the location data defining the distinct geographic location of each respective remote electronic user device comprises at least one of GPS coordinates and latitude and longitude coordinates.

\* \* \* \* \*